(12) United States Patent
Mizunashi

(10) Patent No.: US 8,326,901 B2
(45) Date of Patent: Dec. 4, 2012

(54) DATA PROCESSING APPARATUS, DATA TRANSMISSION METHOD, AND COMPUTER-READABLE RECORDING MEDIUM FOR DATA TRANSMISSION

(75) Inventor: Yohko Mizunashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 231 days.

(21) Appl. No.: 12/789,875

(22) Filed: May 28, 2010

(65) Prior Publication Data

US 2010/0306250 A1 Dec. 2, 2010

(30) Foreign Application Priority Data

Jun. 2, 2009 (JP) ................................. 2009-133459

(51) Int. Cl.
*G06F 12/00* (2006.01)
(52) U.S. Cl. ......... 707/915; 707/769; 707/959; 709/240
(58) Field of Classification Search .................. 707/769, 707/915, 959; 709/240
See application file for complete search history.

(56) References Cited

U.S. PATENT DOCUMENTS

| | | | |
|---|---|---|---|
| 7,219,030 B2* | 5/2007 | Ohtani | 702/122 |
| 7,577,660 B2 | 8/2009 | Ohtani | |
| 2001/0002469 A1* | 5/2001 | Bates et al. | 707/1 |
| 2003/0020960 A1* | 1/2003 | Tanimoto | 358/402 |
| 2004/0119758 A1* | 6/2004 | Grossman et al. | 345/839 |
| 2004/0177076 A1 | 9/2004 | Ohtani | |
| 2005/0004926 A1* | 1/2005 | Ohtani | 707/100 |
| 2005/0005145 A1* | 1/2005 | Teixeira | 713/193 |
| 2005/0120084 A1* | 6/2005 | Hu et al. | 709/206 |
| 2005/0165808 A1 | 7/2005 | Ohtani et al. | |
| 2005/0171942 A1 | 8/2005 | Ohtani et al. | |
| 2005/0210293 A1 | 9/2005 | Ohtani | |
| 2006/0064397 A1* | 3/2006 | Ohtani | 707/1 |
| 2006/0161547 A1* | 7/2006 | Ohtani | 707/9 |
| 2007/0115976 A1* | 5/2007 | Yoshioka | 370/390 |
| 2007/0192053 A1 | 8/2007 | Ohtani | |
| 2007/0206088 A1 | 9/2007 | Mizunashi et al. | |
| 2007/0216960 A1 | 9/2007 | Ohtani | |
| 2008/0072288 A1 | 3/2008 | Ohtani | |
| 2008/0235434 A1 | 9/2008 | Eun et al. | |
| 2009/0009804 A1 | 1/2009 | Matsuda | |

FOREIGN PATENT DOCUMENTS

| | | |
|---|---|---|
| JP | 2001-238020 | 8/2001 |
| JP | 2003-323269 | 11/2003 |
| JP | 2007-123998 | 5/2007 |

* cited by examiner

*Primary Examiner* — Cheyne Ly
(74) *Attorney, Agent, or Firm* — IPUSA, PLLC

(57) ABSTRACT

A data processing apparatus includes plural transmission units that transmits transmission data to one or more users, a storage part that stores a destination group table therein, the destination group table including a data structure in which data of one or more of the plural transmission units are associated with user data of the one or more users, a reception part that receives selection data indicating selection of the one or more users, receives designation data indicating designation of one or more of the plural transmission units, and extracts the user data from the storage part according to the selection data and the designation data, and a transmission request part that requests transmission of the transmission data to at least one of the plural transmission units according to the user data extracted by the reception part.

10 Claims, 35 Drawing Sheets

FIG.8A

| ID | 444 |
|---|---|
| NAME | 4GAddr |
| TYPE | DESTINATION GROUP |
| MEMBER | (MEMBER ID) 777 — ATTRIBUTE NAME: MAIL |
| | (MEMBER ID) 777 — ATTRIBUTE NAME: FOLDER |
| | ... |
| | (MEMBER ID) 555 |

| ID | 555 |
|---|---|
| NAME | TestTAddr |
| TYPE | DESTINATION GROUP |
| MEMBER | (MEMBER ID) 888 — ATTRIBUTE NAME: FOLDER |
| | ... |

FIG.8B

| ID | 444 |
|---|---|
| NAME | 4GAddr |
| TYPE | DESTINATION GROUP |
| MEMBER | (MEMBER ID) 777 |
| | (MEMBER ID) 555 |

| | ATTRIBUTE NAME 1 | MAIL |
|---|---|---|
| | ATTRIBUTE NAME 2 | ... |
| | ... | |

| ID | 555 |
|---|---|
| NAME | TestTAddr |
| TYPE | DESTINATION GROUP |
| MEMBER | (MEMBER ID) 888 |

| | ATTRIBUTE NAME 1 | FOLDER |
|---|---|---|
| | ATTRIBUTE NAME 2 | ... |
| | ... | |

FIG.8C

| ID | 111 |
| --- | --- |
| NAME | 3 OPEN CHAMBERS |
| TYPE | COMBINATION GROUP |
| MEMBER | (MEMBER ID) 222 |
| | (MEMBER ID) 666 |
| | (MEMBER ID) 444 |
| | (MEMBER ID) ... |

| ATTRIBUTE NAME | ... |
| --- | --- |
| ... | |

FIG.8D

| ID | 333 |
|---|---|
| NAME | TEST T |
| TYPE | USER GROUP |
| PRIORITY | MAIL |
| MEMBER | (MEMBER ID) 888 |
| | ... |

FIG.8E

| ID | 888 |
|---|---|
| NAME | SATOH |
| TYPE | USER |
| PRIORITY | FOLDER |
| ATTRIBUTE | MAIL : satoh@a.b |
| | FOLDER : ¥tmp |
| | ... |

FIG.24

GROUP MEMBER REGISTRATION — 620

| REGISTRATION NO. | NAME | NAME PRONUNCIATION | LOGIN NAME | TRANSMISSION UNIT WHEN DESTINATION GROUP IS SELECTED |
|---|---|---|---|---|
| ▶ 001 | ☐ Hamada | hamada | Hamada | ☐ mailadress@dummy.com<br>☐ 004512345670 |
| 003 | ☐ Takeda | takeda | | 004512345670 |
| 004 | ☐ Bamba | bamba | Bamba | 004512345670 |
| 005 | ☐ UserGroup | | | |
| 006 | ☐ DistGroup | | | |

FIG.25

GROUP MEMBER REGISTRATION — 630

TRANSMISSION UNIT WHEN DESTINATION GROUP IS SELECTED

| MAIL — 631 | FAX — 632 | FOLDER — 633 |

| REGISTRATION NO. ▶ | NAME | NAME PRONUNCIATION | LOGIN NAME |
|---|---|---|---|
| ☐ 001 | ▣ Hamada | hamada | Hamada |
| ☐ 003 | ▣ Takeda | takeda | |
| ☐ 004 | ♣ Bamba | bamba | Bamba |
| ☐ 005 | ♣ UserGroup | | |
| ☐ 006 | ♣ DistGroup | | |

FIG.31

| No. | CONDITIONS | | | DESCRIPTION | |
|---|---|---|---|---|---|
| 1 | SEARCH CONDITIONS | ATTRIBUTE | | NAME OF ATTRIBUTE, E.G., NAME, MAIL | |
| | | KEY | | E.G., ohtani, @aaa, bb, c | |
| | | DETERMINATION RANGE | | DESIGNATE METHOD OF APPLYING KEY | |
| | | | | | PERFECT MATCH |
| | | | | | PARTIAL MATCH |
| | | | | | PREFIX MATCH |
| | | | | | SUFFIX MATCH |
| | | | | | EQUAL TO OR GREATER THAN |
| | | | | | EQUAL TO OR LESS THAN |
| | | | | | NO PREFIX MATCH |
| | | | | | NO MATCH |
| | | | | | NO SUFFIX MATCH |
| | | | | | NOT INCLUDED |
| | | FUZZY SEARCH | | DESIGNATE WHETHER USE OF FUZZY SEARCH IS VALID/INVALID | |
| | | | | VALID | |
| | | | | INVALID | |
| | | SEARCH CONDITION DESIGNATION | | DESIGNATE SEARCH CONDITION | |
| | | | | AND | |
| | | | | OR | |
| 2 | CONDITION APPLYING METHOD | | | DESIGNATE CONDITION APPLYING METHOD | |
| | | | | DATA OF DESCENDANT SUBJECT FOR SEARCH | |
| | | | | DATA OF DESCENDANT NOT SUBJECT FOR SEARCH | |
| 3 | MAXIMUM HITS | | | DESIGNATE DESIRED NUMBER OF HITS | |
| 4 | SORTING CONDITIONS | KEY ATTRIBUTE | | DESIGNATE ATTRIBUTE TO BE USED IN SORTING | |
| | | METHOD | | DESIGNATE ANY OF BELOW | |
| | | | | SORTING CONDITION | |
| | | | | ASCENDING ORDER | |
| | | | | DESCENDING ORDER | |
| | | RANK ORDER | | DESIGNATE ANY OF BELOW | |
| | | | | SORTING ORDER | |
| | | | | PRIMARY | |
| | | | | SECONDARY | |
| 5 | ACCESS AUTHORITY FILTER | | | DESIGNATE ACCESS AUTHORITY | |
| | | | | ALL | |
| | | | | DATA HAVING REFERENCE AUTHORITY | DATA HAVING DELETION AUTHORITY |
| | | | | DATA HAVING EDITING AUTHORITY | DATA HAVING OWNER GROUP AUTHORITY |
| | | | | | DATA HAVING OWNER AUTHORITY |

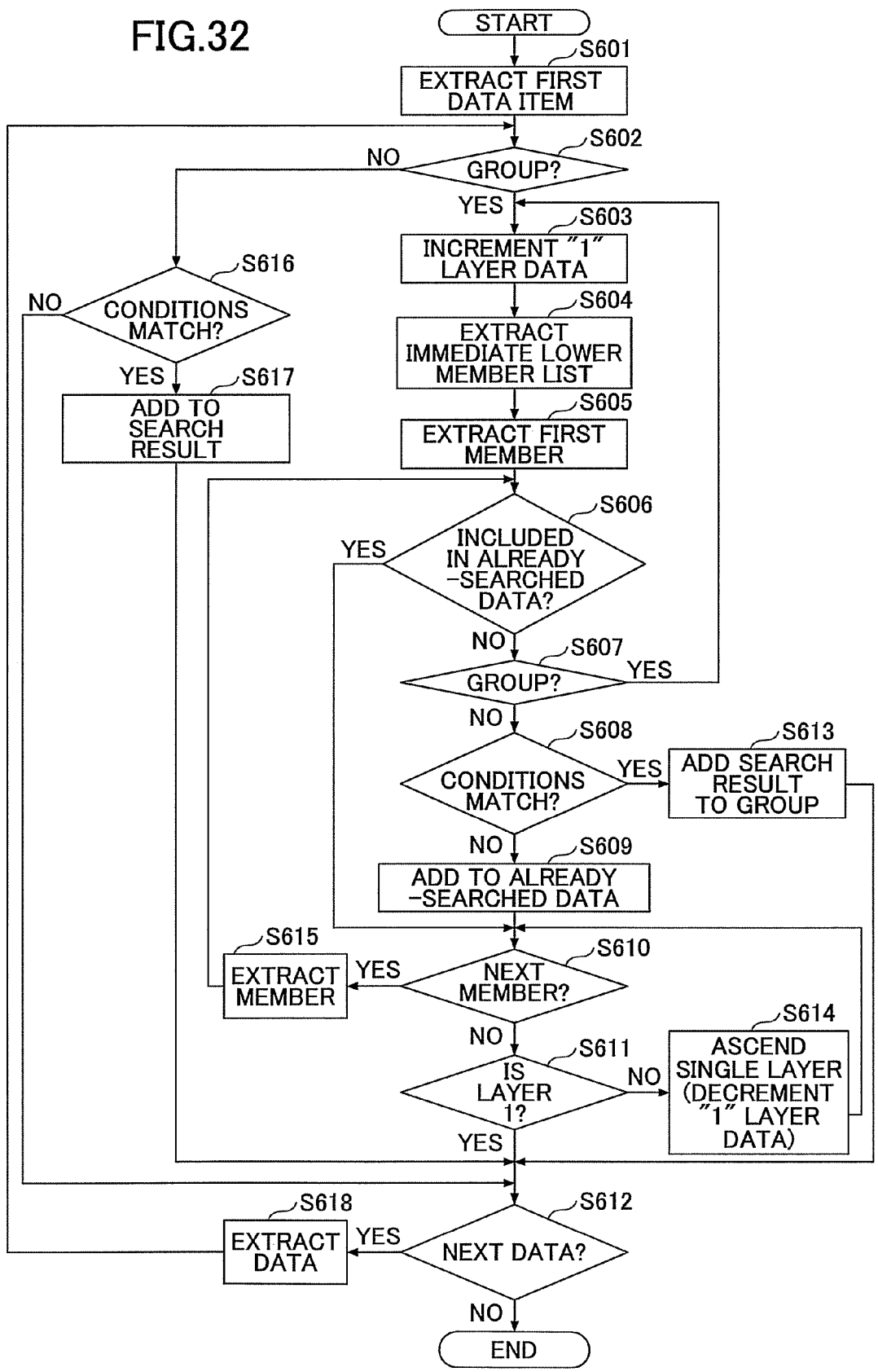

DATA PROCESSING APPARATUS, DATA TRANSMISSION METHOD, AND COMPUTER-READABLE RECORDING MEDIUM FOR DATA TRANSMISSION

BACKGROUND OF THE INVENTION

1. Field of the Invention

The present invention relates to a data processing apparatus including plural transmission units, and more particularly, to a data processing apparatus, a data transmission method, and a computer-readable recording medium for transmitting data from one or more of the plural transmission units.

2. Description of the Related Art

A data processing apparatus (e.g., image forming apparatus), which is connected to other data processing apparatuses (hereinafter also referred to as "client") via a network, can transmit data (e.g., image data) from an image forming apparatus to a user via the client. Therefore, the data processing apparatus has stored an address book of users. Data can be directly input to the address book from a control panel of the data processing apparatus or input from an external apparatus (See, for example, Japanese Laid-Open Patent Publication No. 2003-323269). Japanese Laid-Open Patent Publication No. 2003-323269 discloses a method of grouping addresses and handling the addresses in groups for improving operability of an external apparatus.

A data processing apparatus is equipped with plural transmission units (e.g., electronic mail, facsimile machine). Conventionally, whenever the user (sender) switches the application used for transmitting data (e.g., copier application, scanner application, printer application, facsimile application), the transmission unit capable of transmitting data based on the switched to application is identified. Then, by selecting the destination for the data transmission, the identified application transmits data to the selected destination.

Recent data processing apparatuses are equipped with a "transmission application" dedicated for transmitting data. Further, the transmission application can transmit data to a group having plural users in a batch. Accordingly, the sender selects a group from an address book stored in the data processing apparatus and transmits the data.

In a conventional address book, data of the destinations corresponding to plural transmission units (e.g., mail address, fax number, folder path) are registered with respect to each user. Further, each user belongs to a group. Thus, there may be a case where various destination data correspond to the respective users of the group.

Accordingly, it is difficult for the data processing apparatus to specify the transmission unit used for transmitting the data to the group or the user selected from a screen displayed by the transmission application. For example, in a case where a user having plural destination data is selected as the destination, sending data from all of the transmission units can be troublesome for the sender. Further, in a case where one transmission unit is selected, the sender cannot anticipate which transmission unit is to be used for transmitting the data.

SUMMARY OF THE INVENTION

The present invention may provide a data processing apparatus, a data transmission method, and a computer-readable recording medium that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data processing apparatus, a data transmission method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data processing apparatus including: plural transmission units configured to transmit transmission data to one or more users, a storage part configured to store a destination group table therein, the destination group table including a data structure in which data of one or more of the plural transmission units are associated with user data of the one or more users, a reception part configured to receive selection data indicating selection of the one or more users, receive designation data indicating designation of one or more of the plural transmission units, and extract the user data from the storage part according to the selection data and the designation data; and a transmission request part configured to request transmission of the transmission data to at least one of the plural transmission units according to the user data extracted by the reception part.

Other objects, features and advantages of the present invention will become more apparent from the following detailed description when read in conjunction with the accompanying drawings.

BRIEF DESCRIPTION OF THE DRAWINGS

FIGS. 8A-8E are schematic diagrams illustrating exemplary configurations of groups and entries of user data according to an embodiment of the present invention;

FIG. 24 is a schematic diagram illustrating an example of a group member registration screen used for a method of registering a group at the time of registering a member according to an embodiment of the present invention;

FIG. 25 is a schematic diagram illustrating another example of a group member registration screen used for a method of registering a group at the time of registering a member according to an embodiment of the present invention;

FIG. 31 is a table indicating search conditions of a search according to an embodiment of the present invention; and FIG. 32 is a flowchart illustrating procedures for searching for a destination group within user data according to an embodiment of the present invention.

DETAILED DESCRIPTION OF THE PREFERRED EMBODIMENTS

[Data Transmission System 1000]

Figure 1:
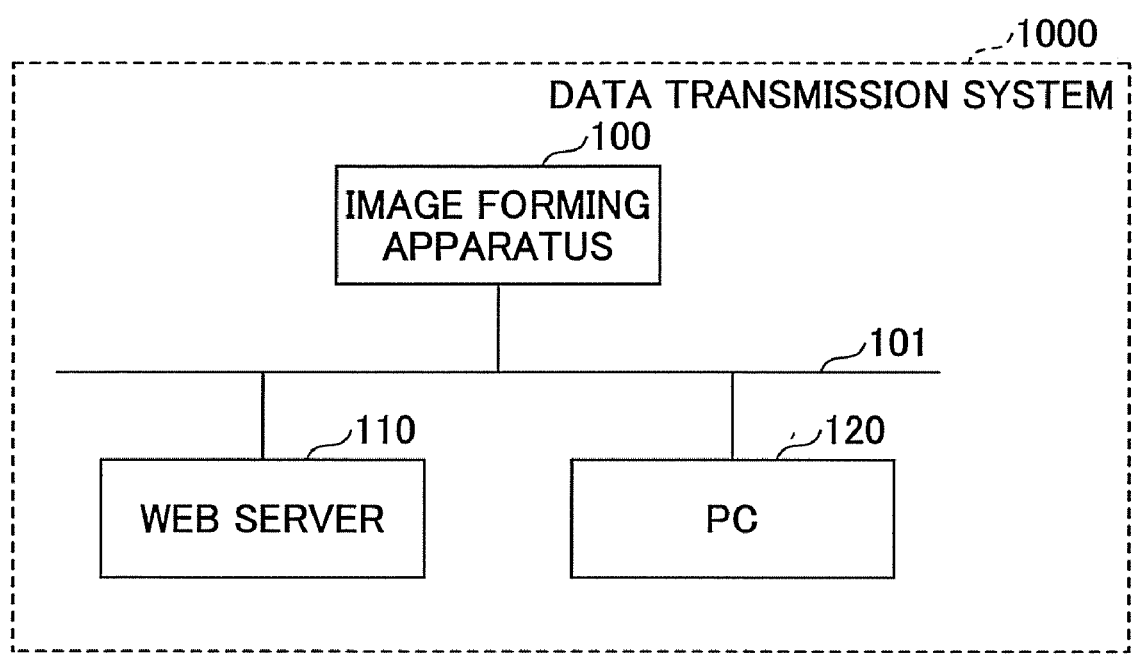
FIG. 1 is a schematic diagram illustrating a configuration of a data transmission system according to an embodiment of the present invention.

FIG. 1 is a schematic diagram illustrating a configuration of a data transmission system 1000 according to an embodiment of the present invention. The data transmission system 1000 includes a data processing apparatus (hereinafter also referred to as an image forming apparatus in the below described embodiments) 100, a Web server 110, and a personal computer (PC) 120 connected via a network 101. The network 101 may be, for example, a local area network (LAN), the Internet, an intranet, or a wide area network (WAN).

The Web server 110 stores data such as user data and user data rules (described in detail below). The Web server 110 provides copies of the stored data to the image forming apparatus 110. The Web server 110 is also used as a backup apparatus. The PC 120 is used for changing the user data rules and updating the user data. The user may use the PC 120 for receiving transmission data transmitted from the image forming apparatus 100. The PC 120 may read out user data or the user data rules from the Web server 110 and change the content of the user data or the user data rules.

According to the embodiments of the present invention, a person who operates the image forming apparatus 100 may be referred to as an "operator" and a person receiving transmission data at a transmission destination may be referred to as a "user". The operator and the user could be the same or different persons. The term "transmission data" refers to any data transmitted from the image forming apparatus 100 to the user, for example, image data obtained by scanning a document with the image forming apparatus 100.

[Image Forming Apparatus 100]

Figure 2:
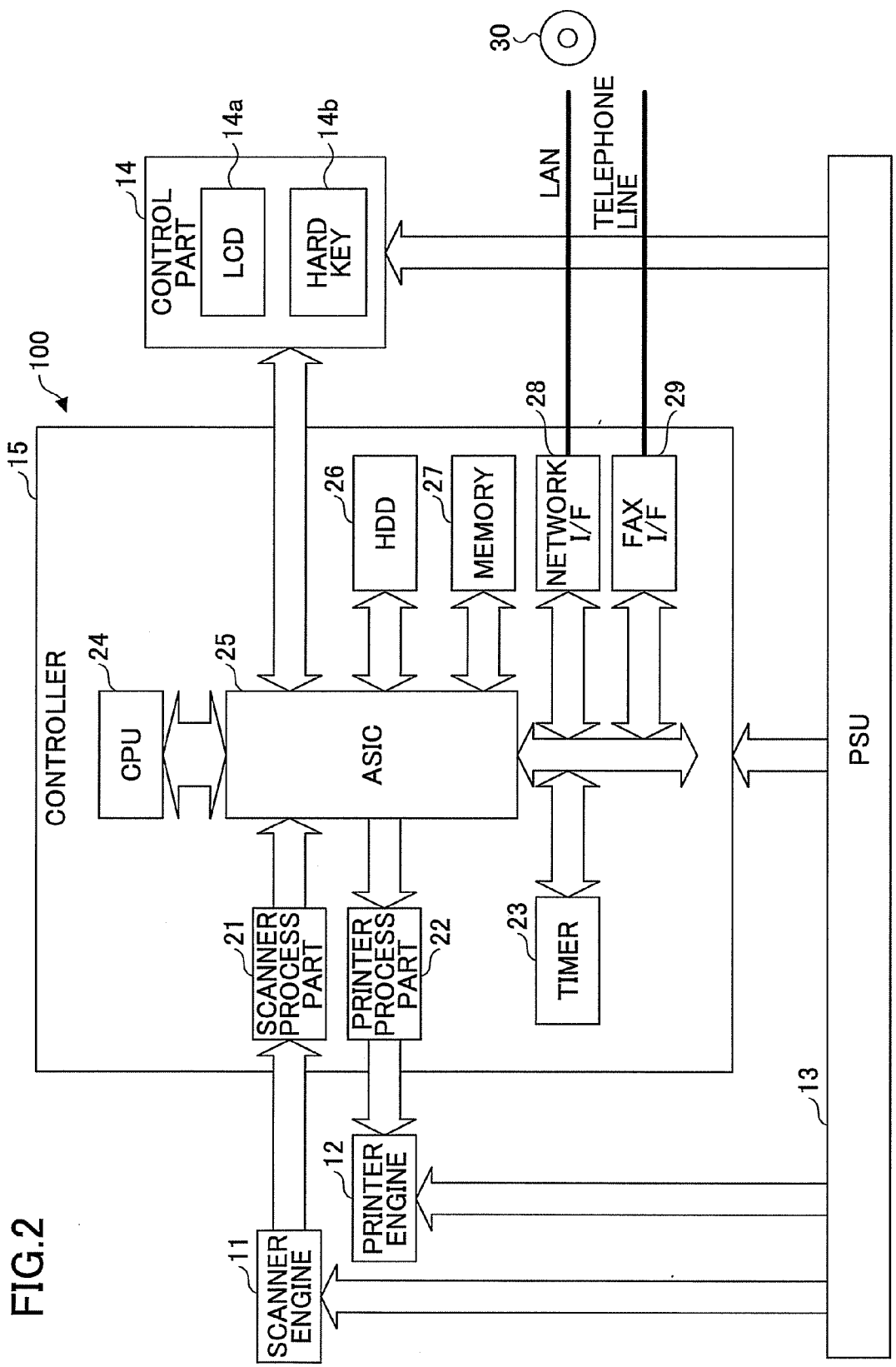
FIG. 2 is a schematic diagram illustrating a hardware configuration of an image forming apparatus according to an embodiment of the present invention.

FIG. 2 is a schematic diagram illustrating a hardware configuration of the image forming apparatus 100 according to an embodiment of the present invention. The image forming apparatus 100 may be, for example, a printer, a facsimile machine, a copy machine, or a scanner. Alternatively, the image forming apparatus 100 may be an MFP (Multi-Function Peripheral) having the functions of, for example, a printer, a facsimile machine, a copy machine, and a scanner. The image forming apparatus 100 in this embodiment of the present invention is described as a MFP.

The image forming apparatus 100 includes a controller 15, a scanner engine 11, a printer engine 12, a PSU (Power Supply Unit) 13, and a control part (operations part) 14. The controller 15 includes a CPU (Central Processing Unit) 24, an ASIC (Application Specific Integrated Circuit) 25, a scanner process part 21, a printer process part 22, a timer 23, a HDD (Hard Disk Drive) 26, a memory 27, a network I/F (network interface) 28, and a fax I/F (facsimile interface) 29 that are connected by a bus.

The control part 14 includes a LCD (Liquid Crystal Display) 14a and a hard key 14b. The LCD 14a has a touch panel integrally formed thereon. The LCD 14a displays various screens and receives instructions from the operator for transmitting transmission data from the image forming apparatus 100. The hard key 14b may include any one of, for example, a ten-key, a start button, a reset button, and an application switching button.

The scanner engine 11 is a reading part of the image forming apparatus 100 for optically reading data from a document. The scanner engine 11 includes, for example, a contact glass, a light source, a lens(es), and an imaging device. The scanner engine 11 is connected to the scanner process part 21. The scanner process part 21 performs A/D conversion on the charges accumulated on the imaging device and generates digital data of a predetermined tone.

The printer engine 12 is for printing, for example, images onto a sheet of paper. The printer engine 12 includes, for example, a photoconductor drum, a charging device, a developing part, a laser irradiating part, a fixing part, and a sheet conveying part. The printer engine 12 is connected to the printer process part 22. The printer process part 22 is for converting image data generated by the scanner process part 21 or converting printing data transmitted from the PC 120 into raster data and transmitting the raster data to the printer engine 12. By transmitting the raster data to the printer engine 12, the printer engine 12 prints an image onto a sheet of paper.

The CPU 24 controls the entire image forming apparatus 100. The ASIC 25 is an integrated chip dedicated for performing various image processes in a scanning process or a printing process. The memory 27 stores various applications executed by the CPU 24 and data used when executing the applications. The HDD 26 is a non-volatile memory for storing data such as image data, programs, and font data. The HDD 26 or a portion of the HDD 26 may be a SSD (Solid State Drive). The CPU 24 provides the below-described functions of the image forming apparatus 100 by executing programs stored in the HDD 26. Further, the programs of the HDD 26 may be distributed in a state recorded on a computer-readable recording medium 30. In this case, the programs are read out from the recording medium 30 and installed in the HDD 26. Alternatively, the programs may be installed in the HDD 26 from a server via the network I/F 28.

In this embodiment, the network I/F 28 is connected to a LAN. The network I/F 28 may be, for example, a NIC (Network Interface Card). The network I/F 28 establishes communications between the image forming apparatus 100 and the Web server 110 and communications between the image forming apparatus 100 and the PC 120 by using a predetermined protocol. The fax I/F 29 is connected to a telephone line. The fax I/F 29 generates image data by demodulating facsimile data from the telephone line. In a case where a facsimile application 44 is activated, image data read out by the scanner engine 11 may be processed for facsimile transmission, modulated, and output to the telephone line.

The PSU 13 is for controlling the power supply to the controller 15, the control part 14, the scanner engine 11, and the printer engine 12.

Figure 3:
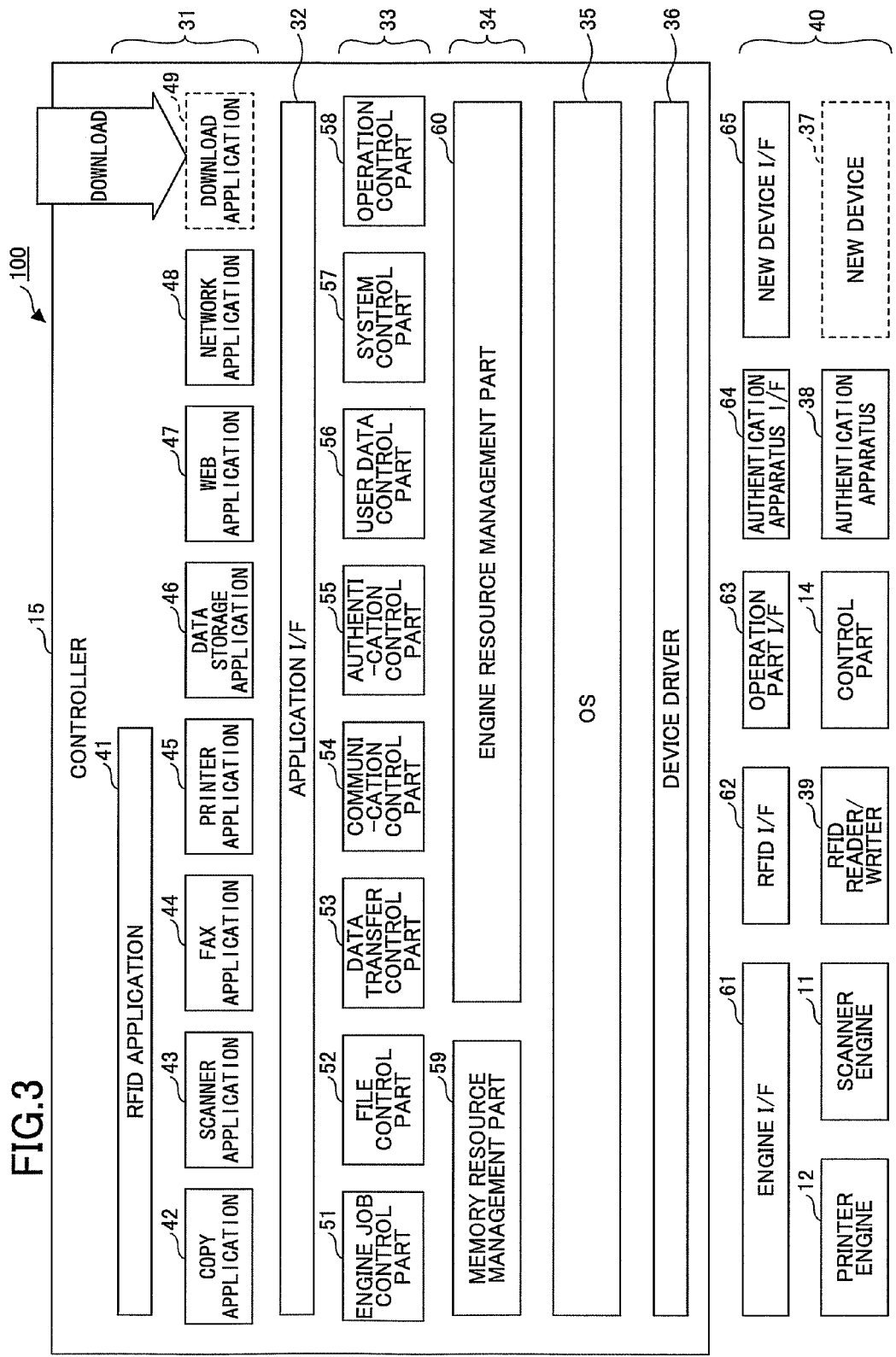
FIG. 3 is a schematic diagram illustrating a software configuration of an image forming apparatus according to an embodiment of the present invention.

FIG. 3 is a schematic diagram illustrating a software configuration of the image forming apparatus 100 according to an embodiment of the present invention. The image forming apparatus 100 includes an application group 31, an application I/F 32, a control function group 33, a resource management group 34, an OS (Operating System) 35, a device driver 36, and various hardware resources 40.

The application group 31 includes an RFID application 41, a copy application 42, a scanner application 43, a facsimile application 44, a printer application 45, a data storage application 46, a Web application 47, a network application 48, and a download application 49. The applications 41-49 are for achieving corresponding functions. Among the applications 41-49, the applications which can transmit transmission data to the PC 120 are transmission applications. For example, the scanner application 43, the facsimile application 44, the data storage application 46, the Web application 47, the network application 48, and the download application 49 are transmission applications.

The data storage application 46 is for providing functions of browsing and selecting image data or printing data stored in the HDD 26. The Web application 47 is for providing a function of a browser that accesses the Web server 110 and displays various data stored in the Web server 110 on the LCD 14a. The network application 48 is for providing a function of communicating with the Web server 110 or the PC 120 via the network 101. The download application 49 is an application downloaded from the Web server 110 or the PC 120 (application for capability expansion). The RFID application 41 is for providing functions of, for example, reading data from an IC card and identifying an operator.

Further, the control function group 33 includes an engine job control part 51, a file control part 52, a data transfer control part 53, a communication control part 54, an authentication control part 55, a user data control part 56, a system control part 57, and an operation control part 58. The engine job control part 51 is for controlling the scanner engine 11 or the printer engine 12 connected to the image forming apparatus 100 via an engine I/F. The file control part 52 is for controlling, for example, updates, deletions, and transfers of various files stored in the HDD 26. The data transfer control part 53 is for controlling, for example, transfer of document data stored in the HDD 26. The communication control part 54 is for controlling communications via the network I/F 28. The authentication control part 55 is for controlling an authentication apparatus 38 via an authentication apparatus I/F 64. The user data control part 56 is for managing user data. The system control part 57 is for performing processes for controlling a system of the image forming apparatus 100. The operation control part 58 is for controlling the control part 14. The control part 14 acts as a data transmitting part for transmitting data between the image forming apparatus 100 and the operator.

A memory resource management part 59 monitors the usage of the memory 27, so as to release or maintain space of the memory 27. An engine resource management part 60 is for controlling the system of the image forming apparatus 100 and managing the hardware resources 40 of the image forming apparatus 100.

The application group 31 requests the control function group 33 to provide functions via the application I/F 32. The control function group 33 interprets the requests from the application group 31 and requests acquirement of the hardware resources 40 (acquirement request). The memory resource management part 59 or the engine resource management part 60 arbitrates the acquirement requests. The OS (e.g., Unix (registered trademark)) 35 executes the software of the above-described applications, the control function group 33, and the resource management part 34 in parallel.

The device driver 36 requests the hardware resources 40 to perform various processes via an engine I/F 61, an RFID I/F 62, an operation part I/F 63, the authentication apparatus I/F 64, and a new device I/F 65. A RFID reader/writer 39 is for reading out data from an IC card by direct or indirect contact with the IC card. The authentication apparatus 38 may be, for example, a hard key for inputting a password or a device for obtaining biometric data. The new device I/F 65 is, for example, a USB interface. The new device I/F 65 can be connected to a new device 37 having a USB interface for using a function(s) of the new device 37. With the above-described configuration of the image forming apparatus 100, the applications 41-49 can be uniformly performed with the control function group 33.

Figure 4:
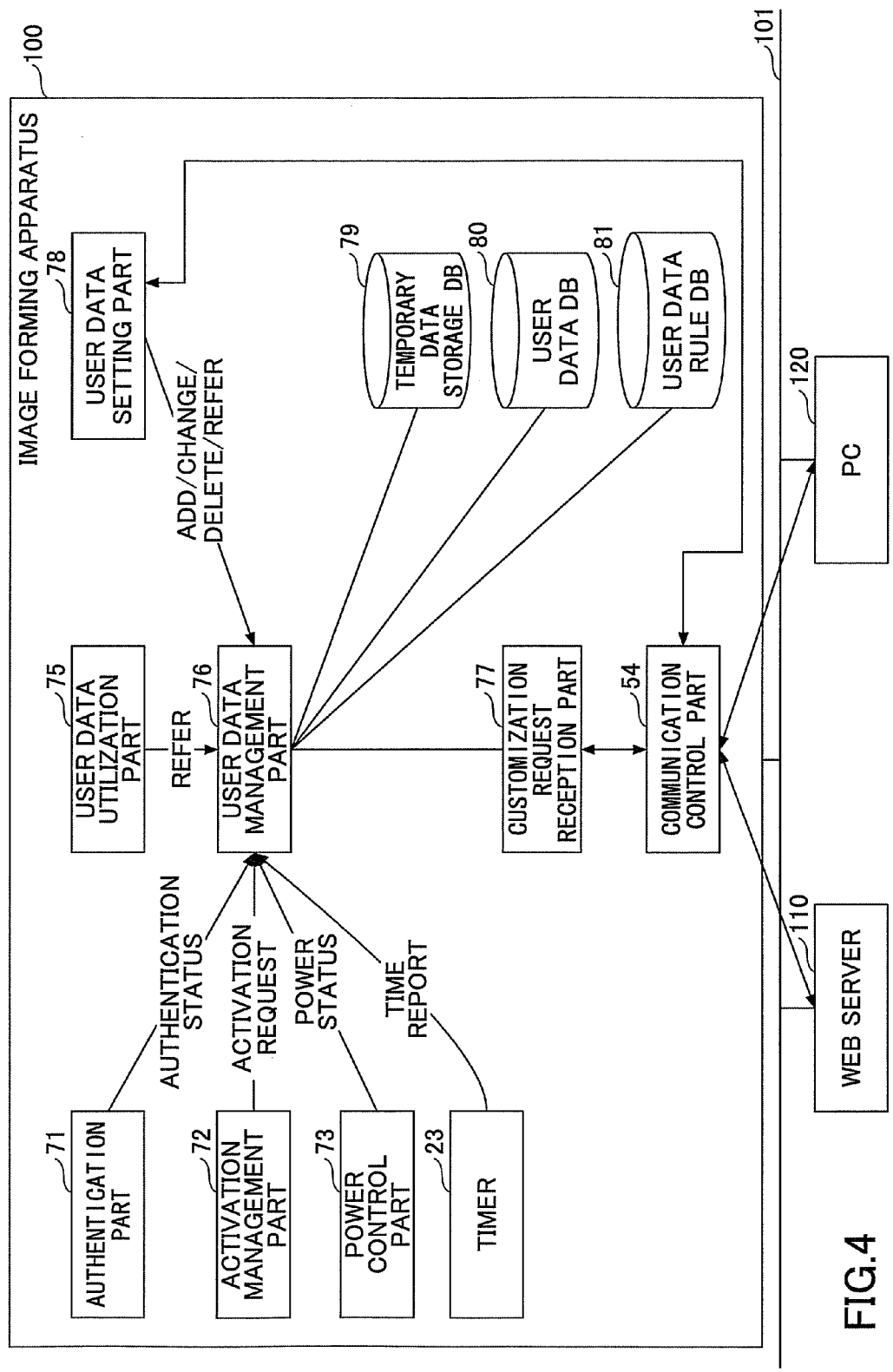
FIG. 4 is a block diagram illustrating functions (function parts) of an image forming apparatus according to an embodiment of the present invention.

FIG. 4 is a block diagram illustrating functions (function parts) of the image forming apparatus 100 according to an embodiment of the present invention. As illustrated in FIG. 4, the image forming apparatus 100 includes an authentication part 71, an activation management part 72, a power control part 73, a timer 23, a user data utilization part 75, a user data management part 76, a customization request reception part 77, the communication control part 54, and a user data setting part 78. The image forming apparatus 100 also includes a temporary data storage database (DB) 79, a user data database (DB) 80, and a user data rule database (DB) 81. These databases 79-81 are installed in, for example, the HDD 26.

The user data setting part 78 and the user data management part 76 mainly provide functions of the user data control part 56. The user data utilization part 75 provides functions of the transmission application such as the scanner application 43, the facsimile application 44, the data storage application 46, the Web application 47, the network application 48, and the download application 49.

The user data DB 80 stores user data therein. In this example, the user data are stored in correspondence with each user. The user data include data indicating, for example, "name", "ID", "type", and "attribute". Further, the user data may also include data indicating "password" and "log-in ID". The "attribute" may include data indicating the destination of transmission data such as an e-mail address, a facsimile number, or a folder path. The below-described "attribute name" refers to a transmitting unit such as "mail", "fax", and "folder".

The user data rule DB 81 has user data rules stored therein. The user data rules indicate specifications of user data. More specifically, the user data rules indicate schema of user data such as items of user data or data formats that can be registered. The user data rules are formed of combinations of entries and combination of entry rules. An entry indicates an item related to user data. As for the types of entries, there are, for example, "user", "user group", "destination group", "attribute", and "sender". One or more attributes can be set to these entries.

For example, in a case where the entry is "user", attributes such as "name" and "identifier" can be set to the entry "user". Whether a blank can be set as an entry is also an attribute. In a case where the entry is "attribute name", a transmission unit such as "mail" or "facsimile" is set as the entry "attribute name". It is to be noted that plural attributes may be set for the same attribute.

The entry rule is set with a rule related to an attribute. The entry rule may include setting items such as "format", "range (size)", "redundancy permission", "wrap value", "required value", "number of times prohibiting same value", "combination", and "initial value". The entry rules are set by setting specific values and data as the setting items.

The user data and the user data rules are temporarily stored in the temporary data storage DB 79.

The user data management part 76 manages the temporary data storage DB 79, the user data DB 80, and the user data rule DB 81. The user data management part 76 monitors addition, change, deletion, and referral (hereinafter also referred to as "access") of data in these databases 79-81 by monitoring authentication results of the operators of the control part 14 and the PC 120. The customization request reception part 77 sends requests to access the user data rule DB 81 to the user data management part 76. The user data setting part 78 and the user data utilization part 75 sends requests to access the user data DB to the user data management part 76.

The customization request reception part 77 refers to, changes, and deletes user data stored in the user data DB 80. The customization request reception part 77 also registers new user data in the user data DB 80. The user data utilization part 75 refers to user data stored in the user data DB 80 via the user data management part 76.

The authentication part 71 determines whether authentication of the operator is valid when the operator logs in. The authentication part 71 reports whether the authentication is valid to the user data management part 76. Further, in a case where the authentication is valid, the authentication part 71 also reports authentication status of, for example, an ID used for identifying the operator.

The activation management part 72 is the first to be activated upon turning on the power of the image forming apparatus 100. The activation management part 72 activates the processes of, for example, the application group 31 and the control function group 33. The processes of the user data management part 76 are also activated. In other words, the activation management part 72 reads out programs corresponding to, for example, the application group 31 and the control function group 33 from the HDD 26 and activates corresponding processes by loading the programs into the memory 27.

The power control part 73 monitors the operating statuses of the hardware resources 40 such as the scanner engine 11 and the printer engine 12. The power control part 73 controls the power supplied from the PSU 13 to the hardware resources 40 according to the operating statuses of the hardware resources 40. Further, the power control part 73 controls the power consumption (e.g., clock frequency) of the controller 15 according to the operating statuses of the hardware resources 40. The power control part 73 reports power statuses of the hardware resources 40 to the user data management part 76.

The timer 23 reports, for example, the time or elapsed time to the user data management part 76. The user data management part 76 uses the report from the timer 23 to perform timer interruption, so that a predetermined process can be executed or execution of a predetermined process can be ended.

Figure 5:
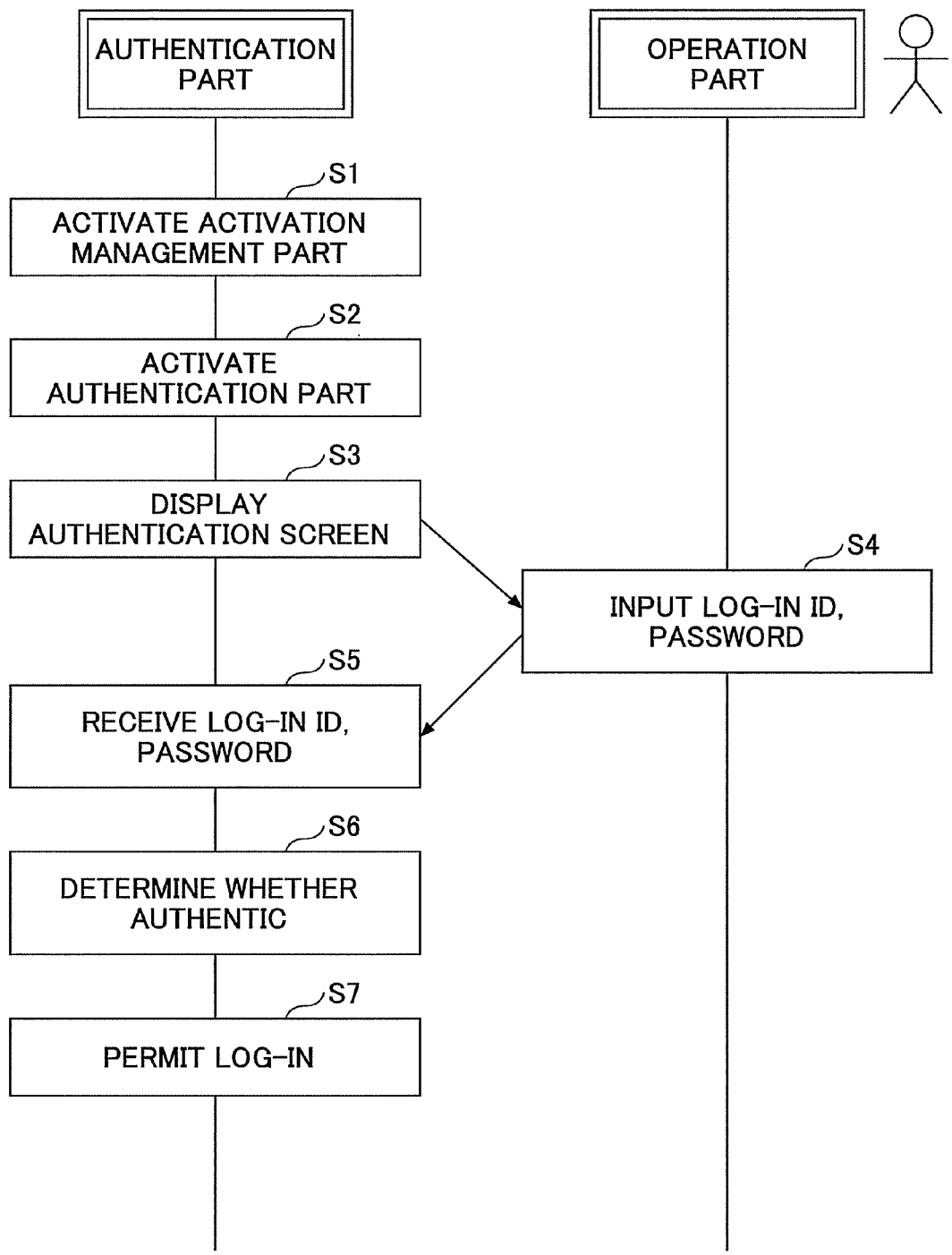
FIG. 5 is a flowchart illustrating procedures of an authentication operation according to an embodiment of the present invention.

FIG. 5 is a flowchart illustrating procedures of an authentication operation according to an embodiment of the present invention.

When the operator turns on the power of the image forming apparatus 100, the activation management part 72 is activated (Step S1). Thereby, the OS 35 and the device driver 36 are activated. Along with activating the application group 31 and the control function group 33, the activation management part 72 also activates the authentication part 71 (Step S2).

The authentication part 71 displays an authentication screen on the LCD 14a of the control part 14 (Step S3). The authentication screen includes input fields for inputting a login ID and a password. The operator inputs a login ID and a password by operating the hard key 14b of the control part 14 and presses an enter button (Step S4).

Then, the authentication part 71 receives the login ID and the password (Step S5). The authentication part 71 transmits a combination of the input login ID and the password to the user data management part 76 and obtains a result (authentication result) of authenticating the operator from the user data management part 76 (Step S6). It is to be noted that the user data management part 76 determines whether the combination of the login ID and the password is authentic depending on whether the login ID and the password are stored beforehand in the user data DB 80. In a case where the combination is not authentic, the authentication part 71 displays an error message on the authentication screen.

In a case where the combination is authentic, the authentication part 71 permits login of the operator. The authentication part 71 reports the permission of the login to the user data management part 76, the user data utilization part 75, the user data setting part 78, and the customization request reception part 77. Further, the authentication part 71 reports the ID identifying the operator to the user data management part 76. In this embodiment, permitting login of the operator refers to permitting the operator to use the image forming apparatus 100.

By authenticating the operator, the user data management part 76 can determine whether to allow addition, change, deletion, or referral of user data or user data rules.

Figure 6:
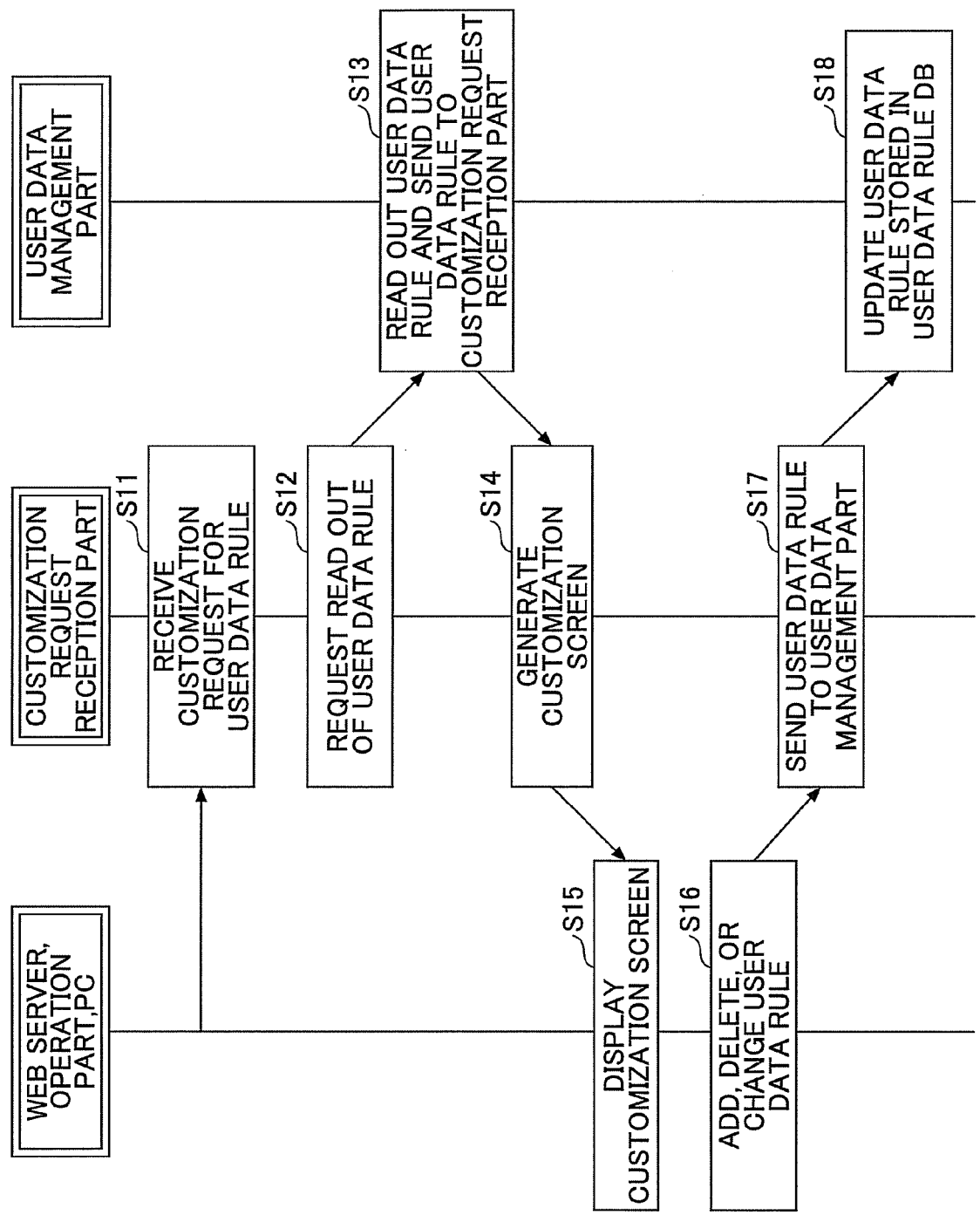
FIG. 6 is a flowchart illustrating procedures of customizing user data rules according to an embodiment of the present invention.

FIG. 6 is a flowchart illustrating procedures of customizing user data rules according to an embodiment of the present invention. The customization of the user data rules is performed in a case where the operator desires to customize a user data rule(s).

The customization request reception part 77 receives requests for customizing the user data rules stored in the user data rules DB 81 (Step S11). The customization request reception part 77 receives the requests from, for example, the PC 120, the Web server 110 or the control part 14. The customization request reception part 77 requests the user data management part 76 to read out a user data rule from the user data rule DB 81 (Step S12).

When the user data management part 76 receives the request, the user data management part 76 reads out the user data rule from the user data rule DB 81 and sends the read out user data rule to the customization request reception part 77 (Step S13).

The customization request reception part 77 generates a customization screen indicating a list of user data rules (Step S14). The customization request reception part 77 sends the data of the customization screen to the PC 120, the Web server 110, or the control part 14 for allowing the customization screen to be displayed on the PC 120, the Web server 110, or the control part 14 (Step S15).

Accordingly, the operator can add, delete, or change user data rules by referring to the user data rules displayed on the customization screen.

For example, the operator adds, deletes, or changes user data rules according to the customization screen and presses an enter button (Step S16). The customization request reception part 77 sends the added, deleted, or changed user data rule to the user data management part 76 along with requesting the addition, deletion, or change of the user data rule (Step S17).

When the user data management part 76 receives the request from the customization request reception part 77, the user data management part 76 updates the user data rules stored in the user data rules DB 81 according to the received user data rule (Step S18).

Accordingly, by registering a schema of user data beforehand, the user data registered in the user data DB 80 can be controlled. Thus, user data can be handled with significant ease.

Figure 7:
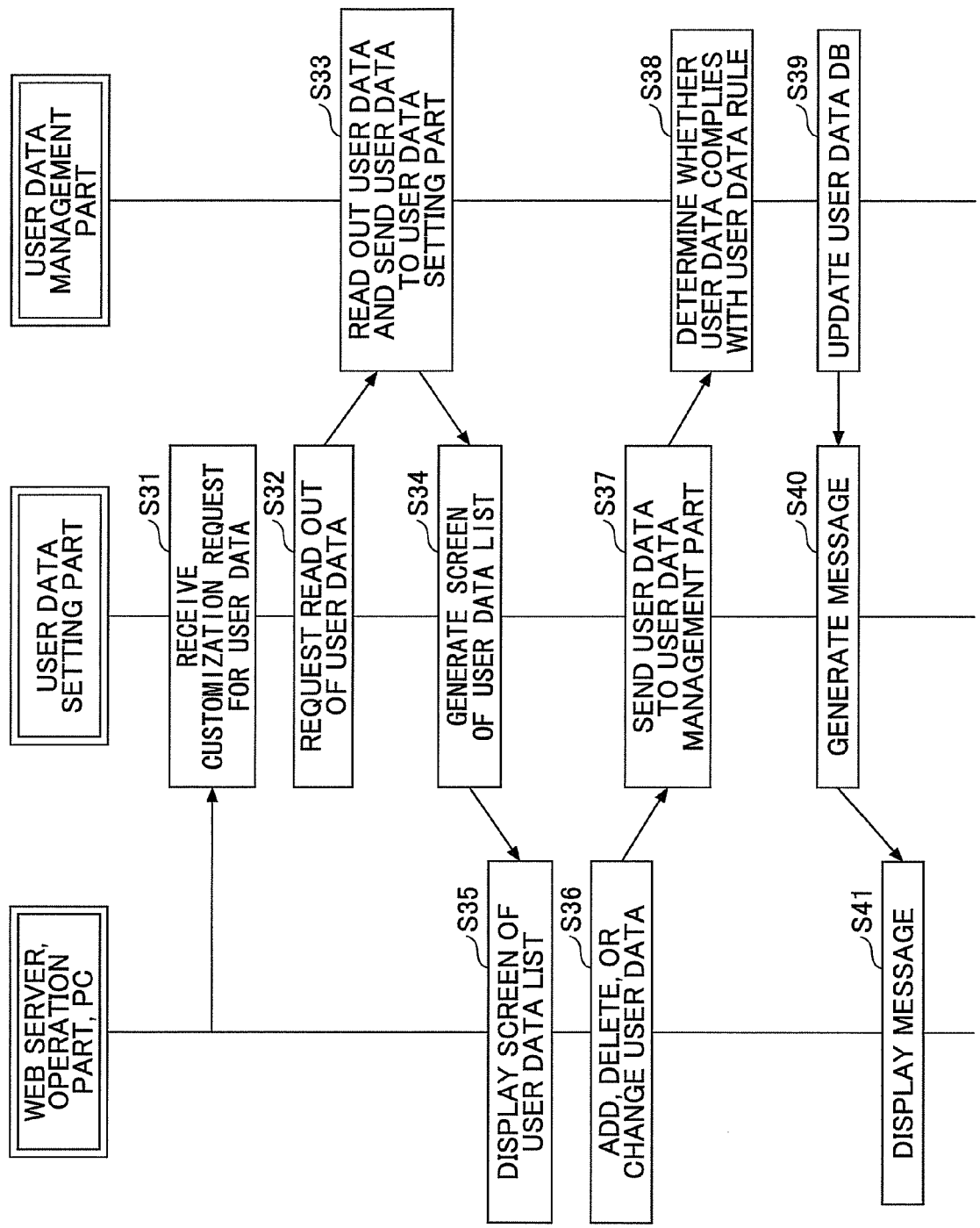
FIG. 7 is a flowchart illustrating procedures for adding, changing, deleting or viewing (referring to) user data according to an embodiment of the present invention.

FIG. 7 is a flowchart illustrating procedures for adding, changing, deleting or viewing (referring to) user data according to an embodiment of the present invention. The adding, changing, deleting, and viewing of user data are performed in a case where the operator desires to customize the user data.

The user data setting part 78 receives requests for customizing the user data stored in the user data DB 80 (Step S31). The user data setting part 78 receives the requests from, for example, the PC 120, the Web server 110 or the control part 14. The user data setting part 78 requests the user data management part 76 to read out user data from the user data DB 80 (Step S32).

When the user data management part 76 receives the request, the user data management part 76 reads out the user data from the user data DB 80 and sends the read out user data to the user data setting part 78 (Step S33).

The user data setting part 78 generates a user data list screen indicating a list of user data (Step S34). The user data setting part 78 sends the data of the user data list screen to the PC 120, the Web server 110, or the control part 14 and instructs the PC 120, the Web server 110, or the control part 14 to display the user data list screen (Step S35).

For example, the operator adds, deletes, or changes user data rules according to the user data list screen and presses an enter button (Step S36). The user data setting part 78 sends the added, deleted, or changed user data to the user data management part 76 along with requesting the addition, deletion, or change of the user data (Step S37).

When the user data management part 76 receives the request from the user data setting part 78, the user data management part 76 determines whether the received user data comply with the corresponding user data rule (Step S38). In a case where the user data comply with the user data rule, the user data management part 76 updates (adds, deletes, or changes) the user data stored in the user data DB 80 according to the received user data rule (Step S39).

In a case where the user data do not comply with the user data rule, the user data management part 76 generates a message indicating that the user data do not comply with the user data rule and reports the message to the user data setting part 78 (Step S40). In a case where the user data comply with the user data rule, the user data management part 76 generates a message indicating that the user data comply with the user data rule and that the user data stored in the user data DB 80 have been updated (Step S40). The user data setting part 78 instructs, for example, the control part 14 to display these messages (Step S41).

FIGS. 8A-8E are schematic diagrams illustrating exemplary configurations of groups and entries of user data according to an embodiment of the present invention. According to an aspect of the image forming apparatus 100 according to an embodiment of the present invention, the image forming apparatus 100 is capable of determining and specifying which transmission unit to use for transmitting transmission data in a case where plural transmission units and plural destination data are registered in association with a single user.

In the following description of the user data managed in the user data DB 80, "transmission unit" is referred to as "attribute name"; "destination data" is referred to as "attribute", "element of a group (group element)" is referred to as "member", "member" or a combination of "member and attribute name" is referred to as "entry", and "group of entries" is referred to as "group".

FIGS. 8A-8D are schematic diagrams illustrating exemplary variations of groups. The group may be a user group, a destination group, or a group including a combination of the user group and the destination (hereinafter referred to as "combination group"). The user group is an existing group which is a set of entries consisting of members only. For example, the group illustrated in FIG. 8D is a user group. The destination group is a group which is a set of entries consisting of combinations of members and attribute names.

FIG. 8A illustrates exemplary variations of destination groups. FIG. 8B illustrates other exemplary variations of destination groups. FIG. 8C illustrates an exemplary variation of a combination group. The groups illustrated in FIGS. 8A-8C are part of user data. In FIGS. 8A-8C, the term "ID" is an identifier for uniquely identifying a group or a user. The "IDs" are assigned group by group for preventing operators and user data management parts 76 from overlapping.

In FIGS. 8A-8C, the term "name" is a name for enabling an operator to distinguish the groups. The operator can discretionally apply a name to a group. A name of, for example, a section or a floor can be applied as a "name" of a group. For example, "4Gaddr" and "TestAddr" are applied as the names of the destination groups illustrated in FIG. 8A.

The term "type" is for distinguishing between a user group, a destination group, and a combination group. The operator can designate the "type". For example, in a case where the "type" is user group, one or more members are included in the group. In a case where the "type" is destination group, one or more members and attribute names (entries) are included in the group. An entry of a single group is also a member. The member may also indicate an ID of a group.

FIG. 8A illustrates destination groups having registered a single attribute name with respect to a single member. In a case where the same member has plural attribute names, entries are provided in the same number as the number of attribute names. For example, as illustrated in an upper group of FIG. 8A, an attribute name "mail" is registered for a member having an ID "777" and an attribute name "folder" is also registered for the member having the ID "777". Therefore, even in a case where members have the same entry, each member can be handled separately. Further, it is easy for the operator to determine the number of members and configuration of the members by viewing the LCD 14a of the control part 14. However, because plural "ID"s are registered for the same member, the data size of a single group becomes large.

FIG. 8B illustrates destination groups having plural attribute names registered with respect to a single member. Even in a case where a single member has plural attribute names, the number of entries is one. For example, two attribute names "mail" and "folder" are registered for a member having an ID "777". Because only one "ID" of the same member is registered, there is a benefit that the data size of a single group is small. However, it is difficult to determine the number of attribute names registered in the group by referring to the number of members.

FIG. 8C illustrates a combination group having entries consisting of members only and entries consisting of members and corresponding attribute names. With the combination group, an entry consisting only of a member and an entry consisting of a member and a corresponding attribute name can be discretionally selected. Therefore, in a case where an operator forms a group, an entry of a member having a specific destination (address) designated and another entry of a member having no specific destination (specific) designated may be combined in the group. Therefore, the degree of freedom of setting the group can be increased.

The groups registered in the user data DB of a single image forming apparatus 100 are not limited to a single variation of the groups illustrated in FIGS. 8A-8C. That is, the operator may discretionally register an attribute name(s) for each group.

FIG. 8D is another schematic diagram illustrating a variation of a group. FIG. 8D illustrates a group in a case where a prioritized attribute name (attribute name to be selected with priority) is registered for a user group. Therefore, the user group of FIG. 8D includes an item "priority". In the user group of FIG. 8D, "mail" is the attribute name to be selected with priority. Although it is necessary to select an attribute name when transmitting transmission data in a case where the group is one of those illustrated in FIGS. 8A-8C, there is no need to select an attribute name in a case where the user group having the configuration of FIG. 8D is selected because the attribute name is already set when the user group of FIG. 8D is selected. This facilitates the setting process of the operator when transmitting data.

FIG. 8E illustrates a group in a case where a prioritized attribute name (attribute name to be selected with priority) is registered for each user. In the group (user data) illustrated in FIG. 8E, plural attribute names and corresponding destination data may registered for the item "attribute". Further, the group of FIG. 8E includes an item "priority" indicating the prioritized attribute name (attribute name to be selected with priority). There is no need to select an attribute name in a case where the user group having the configuration of FIG. 8E is selected because the attribute name is already set when the user of FIG. 8E is selected. This facilitates the setting process of the operator when transmitting data.

With the groups illustrated in FIGS. 8D and 8E, although the setting process is simple when transmitting data, there is a lesser degree of freedom because the attribute name cannot be designated when transmitting data. However, the degree of freedom can be increased if, for example, the operator uses the combination group in combination with the group of FIG. 8D or the group of FIG. 8E. That is, the operator can use the method of designating a prioritized attribute name of FIG. 8D or FIG. 8E only for a user group or a user belonging to a combination group having a specific destination to be designated. Thereby, the operator can positively designate an attribute for a particular user or a user group beforehand and discretionally select an attribute for other users or user groups at the time of data transmission.

In a case where the groups illustrated in FIGS. 8A-8E are registered in the user data DB 80, the ID of a member is used as a key, so that one member can be associated with another. Because members can be linked in a hierarchical structure, the degree of freedom of data structures is high. For example, a member of one group can be further registered in another group.

Figure 9:
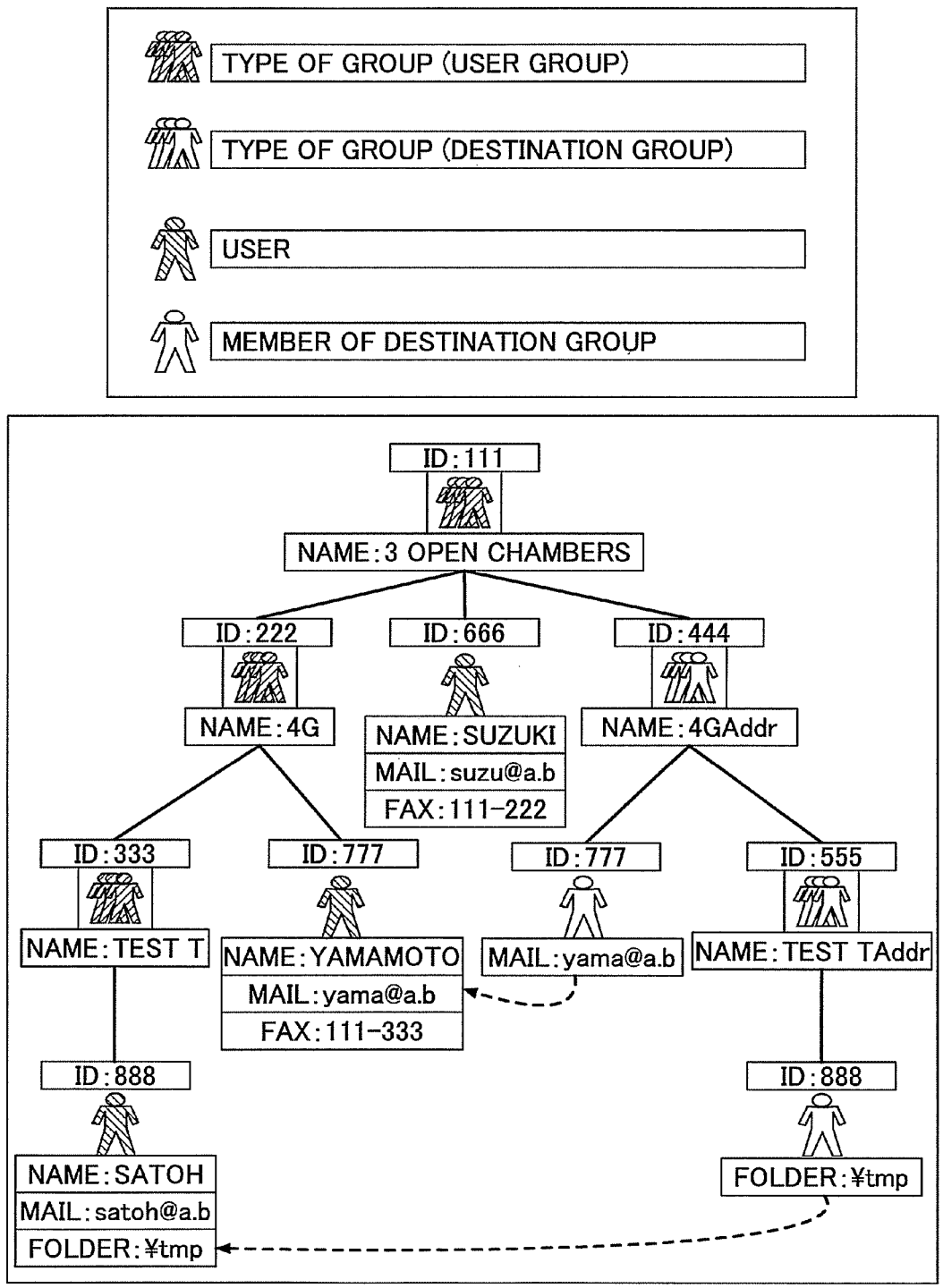
FIG. 9 is a schematic diagram for describing association of members according to an embodiment of the present invention.

FIG. 9 is a schematic diagram for describing the association of members. In the example of FIG. 9, the group of FIG. 8A is used as the destination group. With the combination group of FIG. 8C, three members "222", "666", and "444" are registered in the combination group "111". Accordingly, as illustrated in FIG. 9, the members "222", "666", and "444" are associated with the member "111" in a manner where the members "222", "666", and "444" are provided at a layer below the member "111". In this example, the member "222" is set to a combination group (in FIG. 9, however, "222" is set to a user group) and the member "666" is set to a user.

The member "444" is a destination group. According to FIGS. 8A and 8B, the member "444" includes a member "777" and a member "555". Accordingly, the member "777" and the member "555" are associated to the combination group of the member "444". The member "777" is a member of a destination group, and the member "555" is a destination group.

Because one attribute is registered for one member "777" in FIG. 8A, the attribute name "mail" is associated with the member "777" in FIG. 9. Because the member "555" includes a member "888" in FIG. 8A, the member "888" is associated with the member "555" in FIG. 9. Because the member "888" is user data in FIG. 8E, the attribute name "folder" is associated with the member "888" in FIG. 9.

According to the association illustrated below the member "222" in FIG. 9, the member "222" includes a member "333"

which is a user group and the member "777" which is a user. Further, in FIG. 9, the member "777" which is a user includes plural attributes "mail" and "fax".

Because the member "333" which is a user group includes a member "888" in FIG. 8D, the member "333" is associated with the member "888" in FIG. 9. Because the member "888" which is a user includes plural attribute names "mail" and "folder" in FIG. 8E, the attribute names "mail" and "folder" are associated with the member "888" in FIG. 9.

As illustrated with the dotted arrows in FIG. 9, even if the data of the group used for association are the same (e.g., member "777" and "888"), the "attribute name" which can be selected differs depending on whether an attribute is obtained from the destination group "444" or the user group "222". That is, in a case where an attribute name is obtained from the destination group "444", the attribute name of the member "777" is "mail" only (i.e. only one transmission unit). In a case where an attribute name is obtained from the user group (combination group) "222", the attribute names of the member "777" are "mail" and "fax" (two transmission units). Therefore, the operator can designate a desired attribute name when transmitting transmission data.

In a case of transmitting transmission data to the user by using a transmission application according to an embodiment of the present invention, the operator can select from a user group, a destination group, and a combination group. The user data utilization part 75 displays a transmission screen on the LCD 14a of the control part 14 in accordance with a group selected by the operator.

Figure 10:
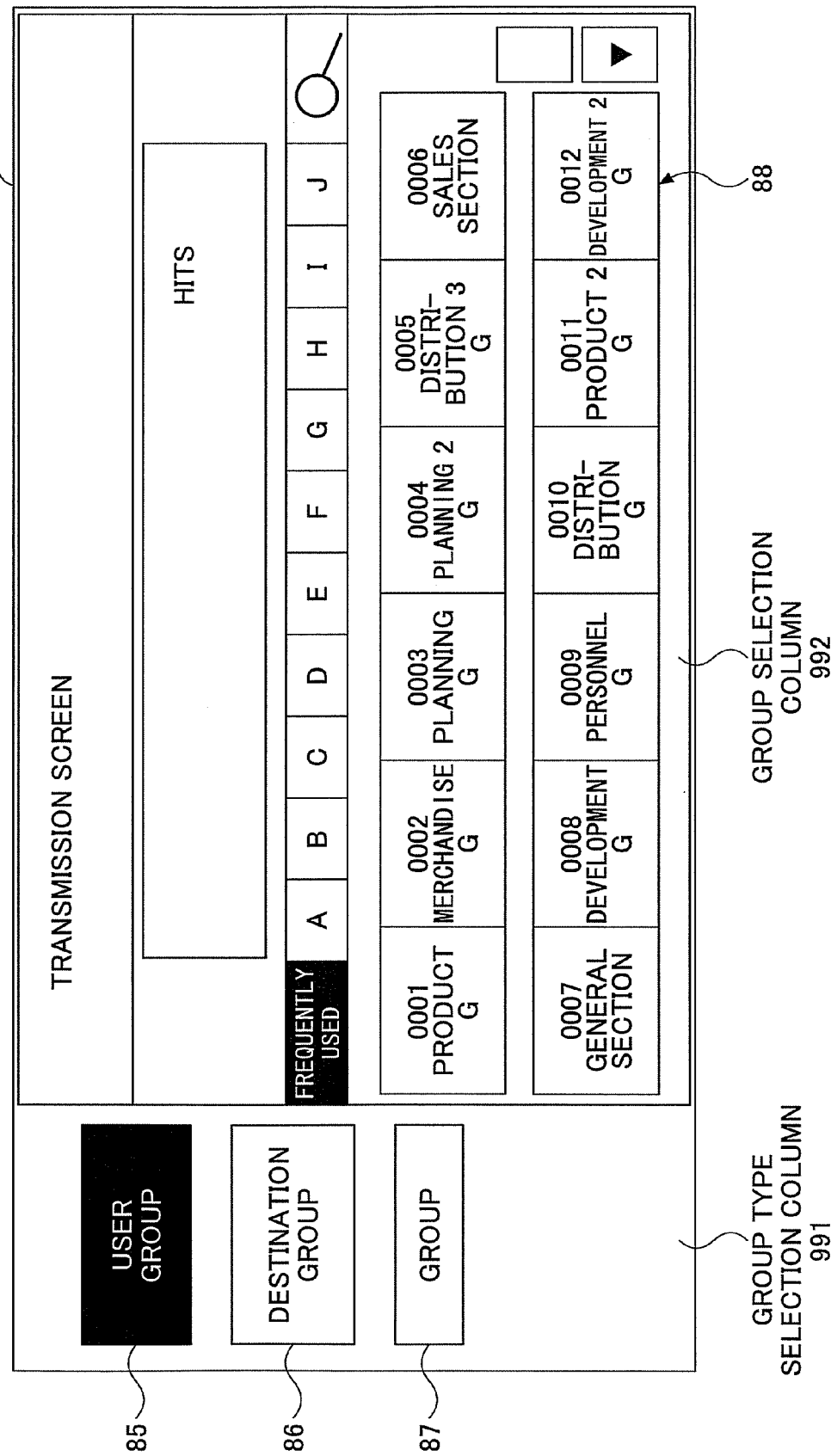
FIG. 10 illustrates an example of a transmission screen in a case where a user group is selected according to an embodiment of the present invention.

FIG. 10 illustrates an example of a transmission screen 99 in a case where a user group is selected. The transmission screen 99 includes a group type selection column 991 and a group selection column 992. The group type selection column 991 includes a "user group" key 85, a "destination group" key 86, and a "group" key 87. The "user group" key 85 is a key for receiving selection of a user group. The "destination group" key 86 is a key for receiving selection of a destination group. The "group" key 87 is a key for receiving selection of a user group and a destination group (that is, a combination group).

The group selection column 992 includes, for example, various kinds of "group selection" keys 88. Prior to selection of a group by the operator, "group selection" keys 88 corresponding to frequently used (regularly used) groups are displayed on the transmission screen 99. The group selection column 992 includes "ABC selection" keys. The "group selection" keys 88 are displayed on the transmission screen according to selection of the operator.

Figure 11:
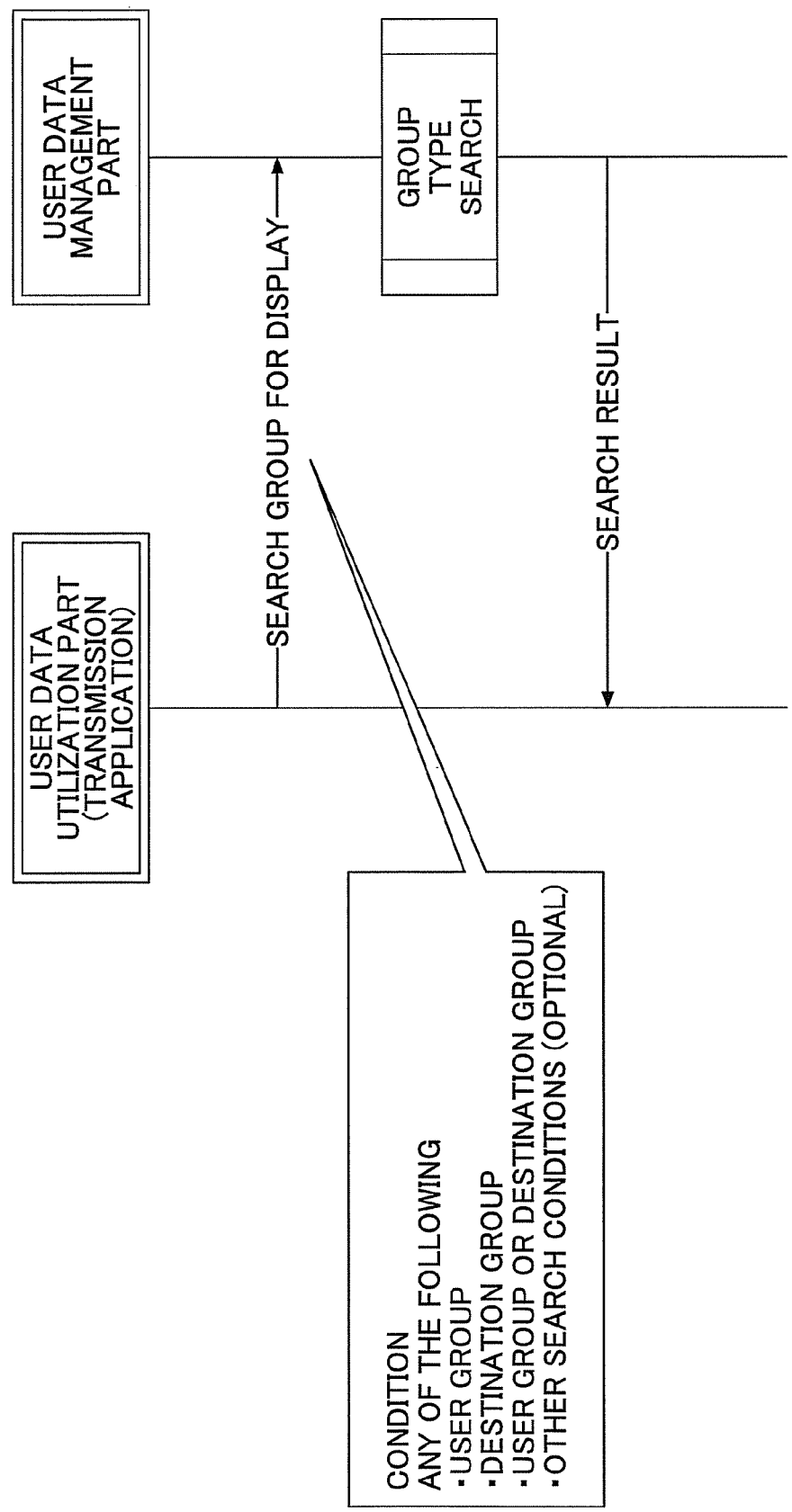
FIG. 11 is a sequence diagram illustrating procedures of reconfiguring a transmission screen according to an embodiment of the present invention.

FIG. 11 is a sequence diagram illustrating the procedures of reconfiguring the transmission screen 99 according to an embodiment of the present invention. With the transmission screen 99 illustrated in FIG. 10, when the operator selects one of the "user group" key 85, the "destination group" key 86, and the "group" key 87, the user data utilization part 75 receives the selection made by the operator via the control part 14.

The user data utilization part 75 requests the user data management part 76 to search for a group(s) to be displayed. The request for the search includes group type data corresponding to the "user group" key 85, the "destination group" key 86, and the "group" key 87. Other conditions for the search may be included in the request.

The user data management part 76 searches the user data DB 80 by using the group type data. The procedures of the search are described below with reference to the illustration in FIG. 12. The user data management part 76 transmits the results of the search to the user data utilization part 75. The search results include, for example, the names of groups and the IDs of the groups.

After the user data utilization part 75 receives the search results, the user data utilization part 75 generates data of the "group selection" keys 88 by using the data of the names of groups and IDs of the groups obtained from the user data management part 76, rearranges the generated data of the "group selection" keys (where appropriate), rearranges (reconfigures) the data of the "group selection" keys 88, and displays the rearranged data of the "group selection" keys 88 on the control part 14.

Accordingly, only the group of the "group selection" keys 88 selected by the operator is displayed on the transmission screen 99.

Figure 12:
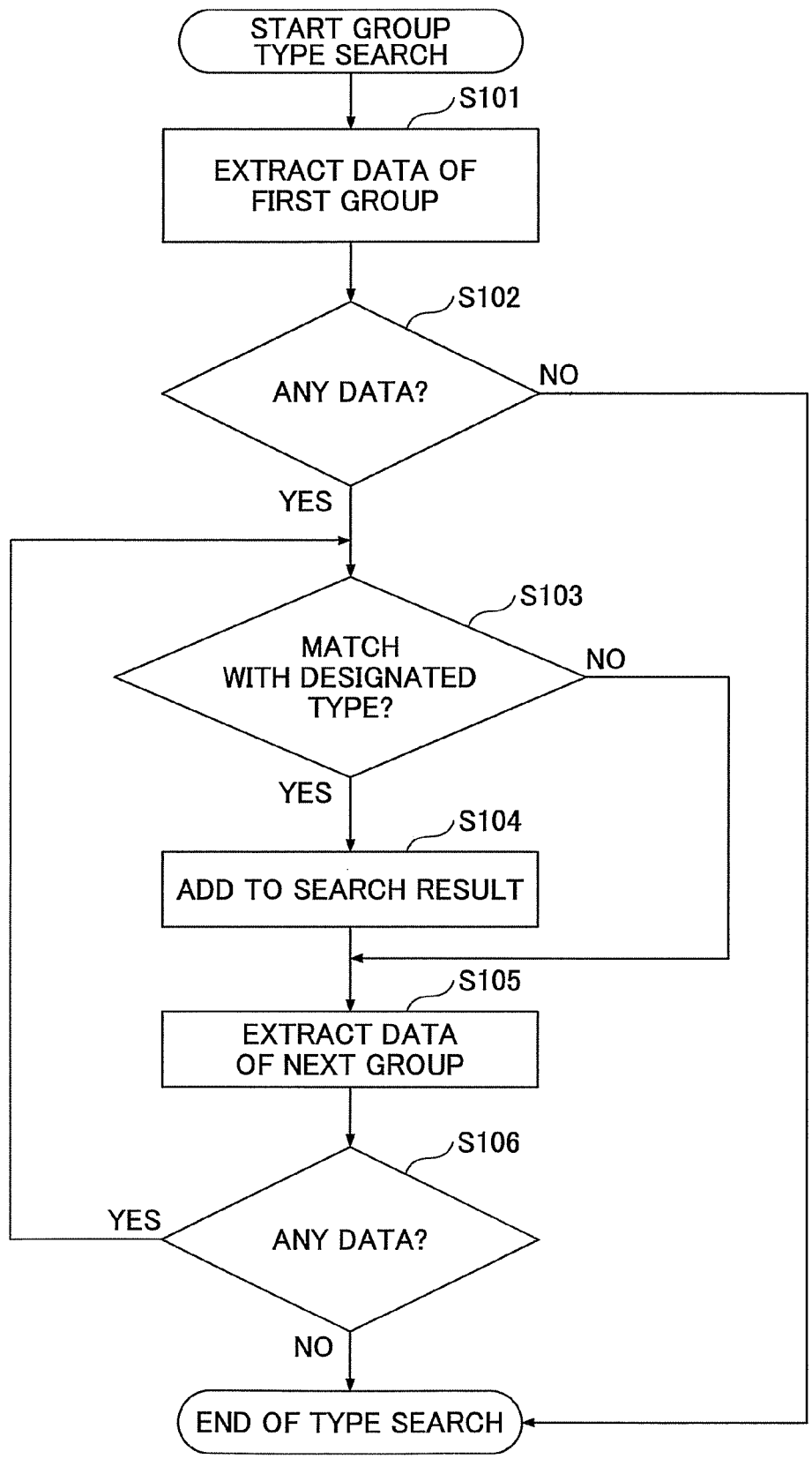
FIG. 12 is a flowchart illustrating procedures of a search for groups to be displayed by using the group type data illustrated FIG. 11.

FIG. 12 is a flowchart illustrating procedures of the search for groups to be displayed by using the group type data of FIG. 11.

The user data management part 76 searches through the groups stored in the user data DB 80 one by one and reads out (extracts) a group that matches the group type data from the user data DB 80 (Step S101).

Then, the user data management part 76 determines whether there are any groups that have not yet been searched (S102). In a case where there is no unsearched group (No in Step S102), the operation of FIG. 12 is terminated because no unsearched group indicates that all groups have been searched.

In a case where there is an unsearched group(s) (Yes in Step S102), the user data management part 76 determines whether the next group in the user data DB matches the group type data (Step S103).

In a case where there is a group that matches the group type data (Yes in Step S103), the user data management part 76 adds the matching group to the search result (Step S104). Accordingly, the group name and the group ID of the matching group are added to the search result.

In a case where there is no group that matches the group type data (No in Step S103), the user data management part 76 searches through the groups stored in the user data DB 80 one by one and reads out (extracts) the next group that matches the group type data from the user data DB 80 (Step S105). The user data management part 76 determines whether there are any groups that have not yet been searched (S106). In a case where there is no unsearched group (No in Step S106), the operation of FIG. 12 is terminated. In a case where there is an unsearched group(s) (Yes in Step S106), the user data management part 76 repeats the processes performed on and after Step S103.

Accordingly, the group name(s) and ID(s) of the group selected by the operator can be read out from the user data DB 80.

Figure 13:
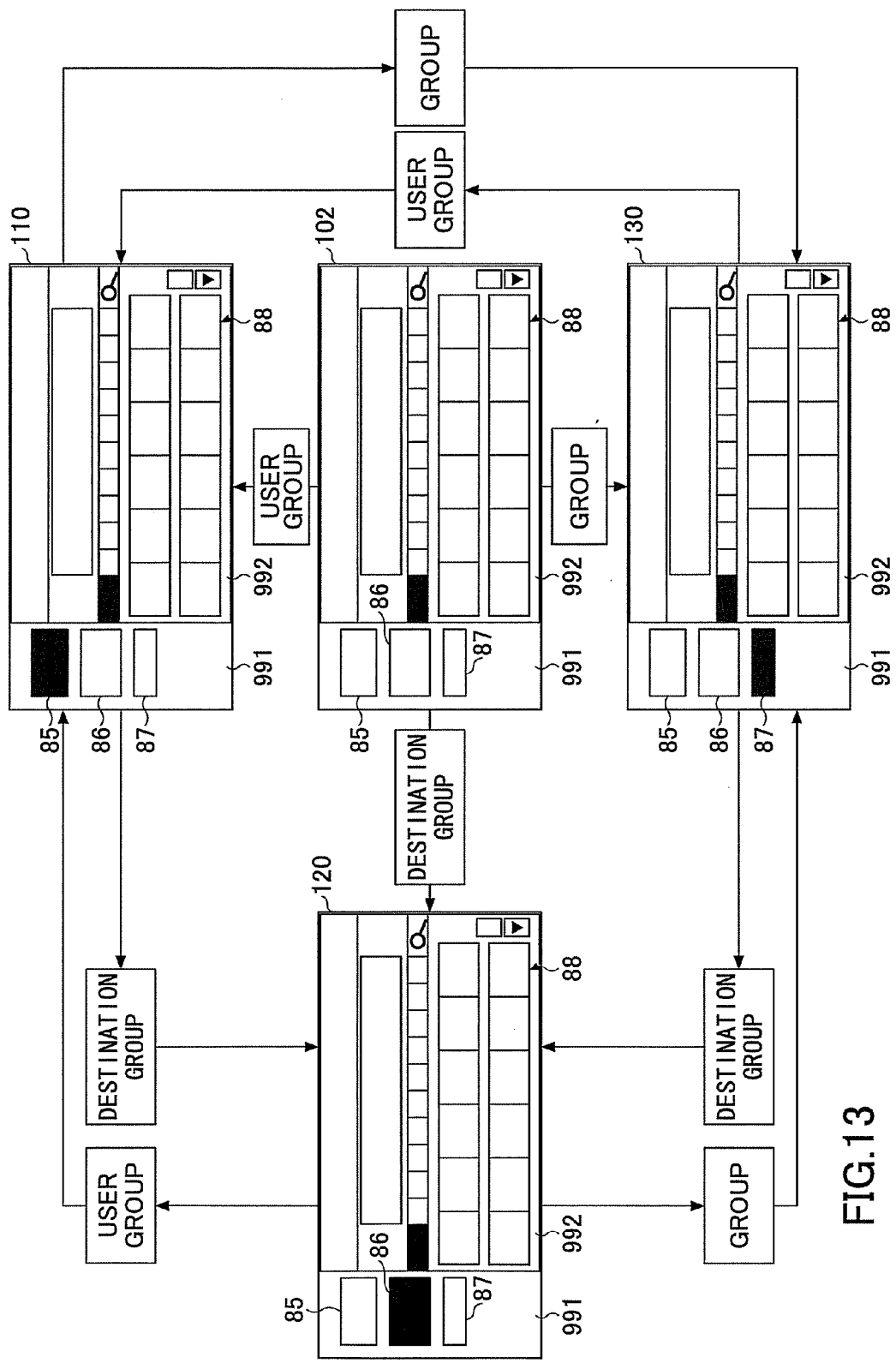
FIG. 13 is a schematic diagram illustrating transition of screens in case where a selection is made with a "user group" key, a "destination group" key, or a "group" key according to an embodiment of the present invention.

FIG. 13 is a schematic diagram illustrating the transition of screens in case where a selection is made with the "user group" key 85, the "destination group" key 86, or the "group" key 87. For example, the user data utilization part 75 displays a screen 102 illustrated in FIG. 13. The screen 102 shows a list of "group selection" keys 88 corresponding to groups that are frequently used.

In a case where the operator selects the "user group" key 85 from the group type selection column 991, the user data utilization part 75 receives the selection of the user group. Accordingly, the user data utilization part 75 sends group type data of the selected user group to the user data management part 76. Then, the user data management part 76 searches through user groups in the manner illustrated in the flowchart of FIG. 12. Then, the user data management part 76 sends the search results to the user data utilization part 75. The user data utilization part 75 displays a screen 110 based on the transmitted search results as illustrated in FIG. 13.

In a case where the operator selects the "destination group" key 86 from the group type selection column 991, the user data utilization part 75 receives the selection of the user group. Accordingly, the user data utilization part 75 sends group type data of the selected destination group to the user data management part 76. Then, the user data management part 76 searches through destination groups in the manner illustrated in the flowchart of FIG. 12. Then, the user data management part 76 sends the search results to the user data utilization part 75. The user data utilization part 75 displays a screen 120 based on the transmitted search results as illustrated in FIG. 13.

In a case where the operator selects the "group" key 87 from the group type selection column 991, the user data utilization part 75 receives the selection of the group (combination group). Accordingly, the user data utilization part 75 sends group type data of the selected combination group to the user data management part 76. Then, the user data management part 76 searches through combination groups in the manner illustrated in the flowchart of FIG. 12. Then, the user data management part 76 sends the search results to the user data utilization part 75. The user data utilization part 75 displays a screen 130 based on the transmitted search results as illustrated in FIG. 13.

The screens 110, 120, and 130 may be switched from one to another. For example, in a case where the operator selects "destination group" from the screen 110 displaying a user group, the user data utilization part 75 displays the screen 120 as illustrated in FIG. 13. In a case where the operator selects "group" from the screen 120 displaying a destination group, the user data utilization part 75 displays the screen 130 as illustrated in FIG. 13.

In a case where the operator selects "destination group" from the screen 130 displaying a combination group, the user data utilization part 75 displays the screen 120 as illustrated in FIG. 13. In a case where the operator selects "user group" from the screen 130 displaying a combination group, the user data utilization part 75 displays the screen 110 as illustrated in FIG. 13.

In the manner described above, screens 110, 120, and 130 may be switched from one to another.

In a case where user data having the configurations of the destination group, the combination group, and the user group (as illustrated in FIGS. 8A-8E) are registered in the image forming apparatus 100, the image forming apparatus 100 provides various methods for enabling the user data utilization part 75 to determine the transmission unit. For example, one transmission unit selecting method provided by the image forming apparatus 100 is a method where the operator selects a transmission unit when selecting the group of a transmission destination. Another transmission unit selecting method provided by the image forming apparatus 100 is a method where a transmission unit is designated with priority (as illustrated in FIGS. 8D-8E).

Figure 14:
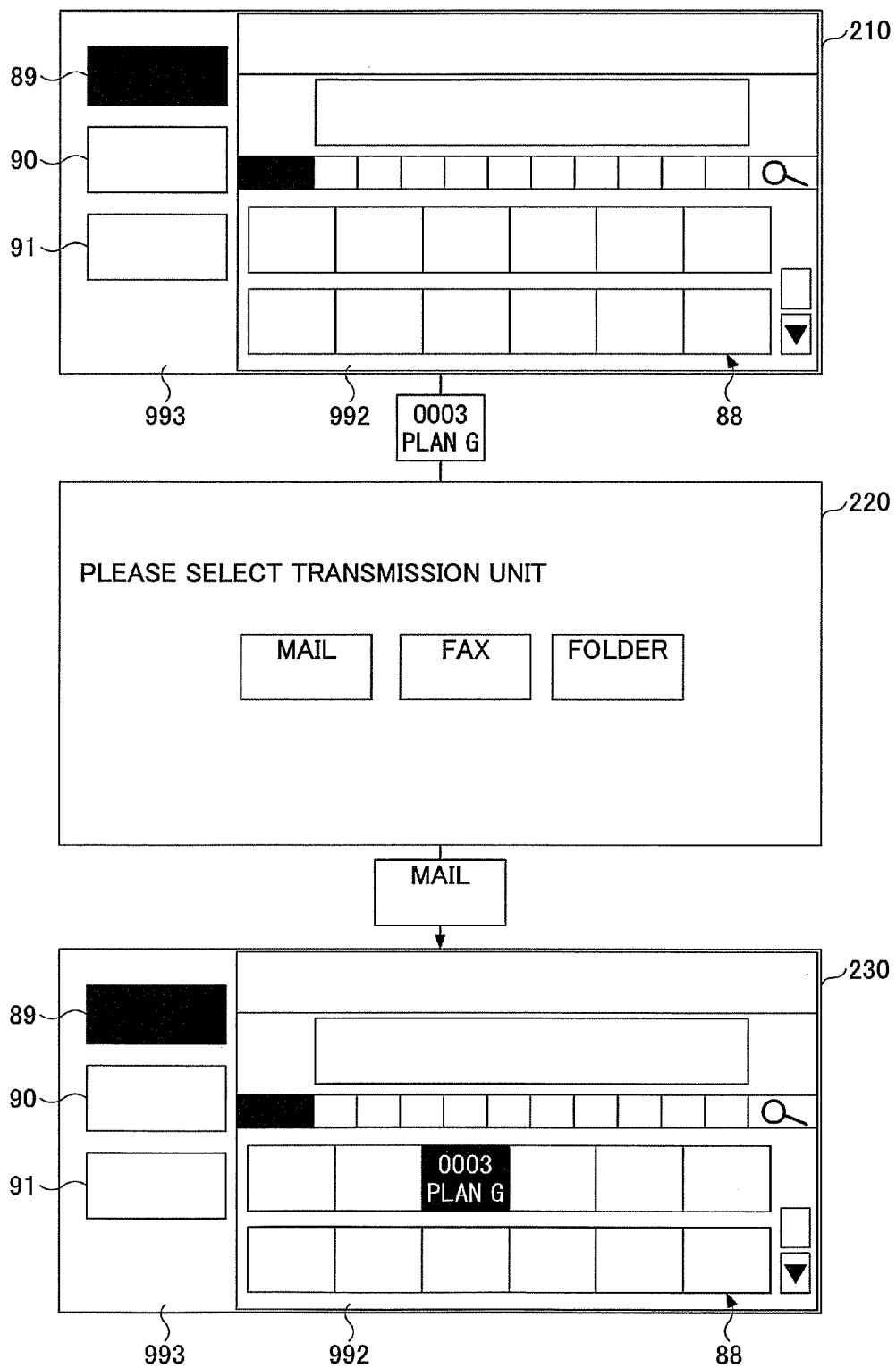
FIG. 14 is a schematic diagram illustrating selection screens for selecting a transmission unit according to an embodiment of the present invention.

FIG. 14 is a schematic diagram illustrating selection screens 210-230 for selecting a transmission unit according to an embodiment of the present invention. The selection screen 210 includes a transmission unit designation column 993 and a group selection column 992. The transmission unit designation column 993 includes a "selection time designation" key 89, a "user setting" key 90, and a "group designation" key 91. The "selection time designation" key 89 is for receiving a designation of a transmission unit selected by the operator at the time when the operator is to select a group. The "user setting" key 90 is for receiving a designation of a transmission unit selected according to the transmission unit set in the column "priority" of a corresponding user (see, for example, FIG. 8E). The "group designation" key 91 is for receiving a designation of a transmission unit selected according to the transmission unit set in the column "priority" of a corresponding user group (see, for example, FIG. 8D). The transmission unit designation column 993 of FIG. 14 may be displayed on the same screen with the group type selection column 991 of FIG. 10.

In the transmission unit designation column 993 of the selection screen 210 illustrated in FIG. 14, the "selection time designation" key 89 is selected by the operator. Therefore, FIG. 14 shows the "selection time designation" key 89 displayed in an inverted manner. In a case where the operator selects "plan G" of the "group selection" keys 88, a selection screen (also referred to as "transmission unit selection screen) 220 is displayed as illustrated in FIG. 14.

In the selection screen 220, "mail", "fax", and "folder" are displayed as the choices of the transmission unit. In a case where the operator selects "mail", the selection screen 220 changes to a selection screen 230. When the operator commands execution of a document scanning process where "mail" is selected, transmission data are transmitted by electronic mail to the member "plan G". In a case where a destination group or a user group is further registered in the member "plan G", the user data utilization part 75 searches for a user(s) by tracing the association of members illustrated in FIG. 9.

Figure 15:
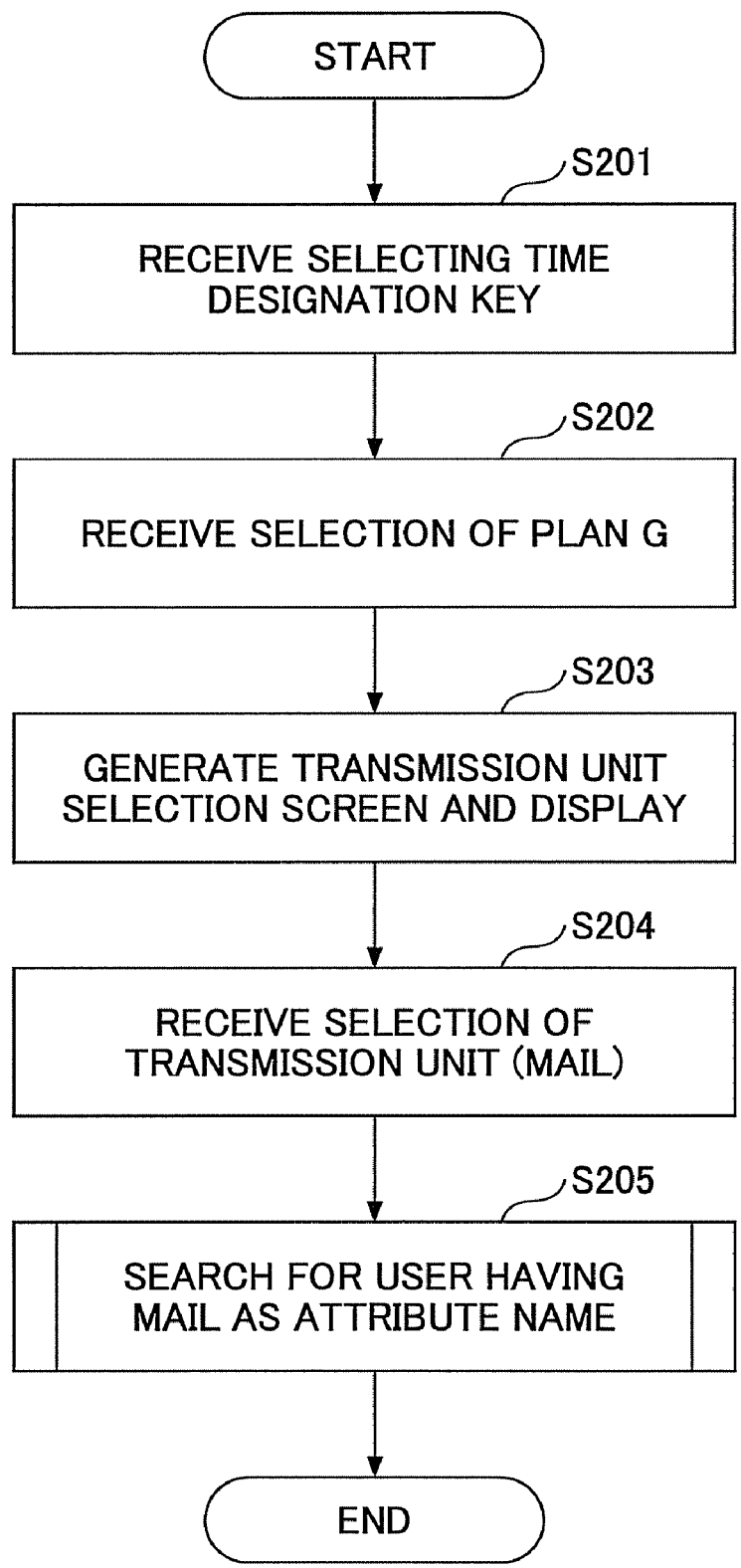
FIG. 15 is a flowchart illustrating procedures for selecting a transmission unit at the time when an operator is to select a group according to an embodiment of the present invention.

FIG. 15 is a flowchart illustrating procedures for selecting a transmission unit at the time when the operator is to select a group. The user data utilization part 75 receives a selection of the "selecting time designation" key 89 selected from the selection screen 210 by the operator (Step S201). The user data utilization part 75 also receives a selection of the "plan G" key selected from the selection screen 210 by the operator (Step S202).

In a case where the "selection time designation" key 89 is selected, the transmission unit is to be designated (selected) by the user. Therefore, the user data utilization part 75 generates data of a selection screen (transmission unit selection screen) and displays the selection screen on the control part 14 according to the generated data (Step S203). The transmission unit(s) that can be selected is registered beforehand in the user data utilization part 75.

Then, the user data utilization part 75 receives data indicating the selection of the transmission unit (mail) (Step S204). Thereby, the user data utilization part 75 obtains the ID of the "plan G" and transmission unit data that identify the selected transmission unit (Step S204). Then, the user data utilization part 75 transmits the obtained ID and the transmission unit data to the user data management part 76. Then, the user data management part 76 searches for a matching group based on the obtained transmission unit data (Step S205). Further details of the search are described below.

Figure 16:
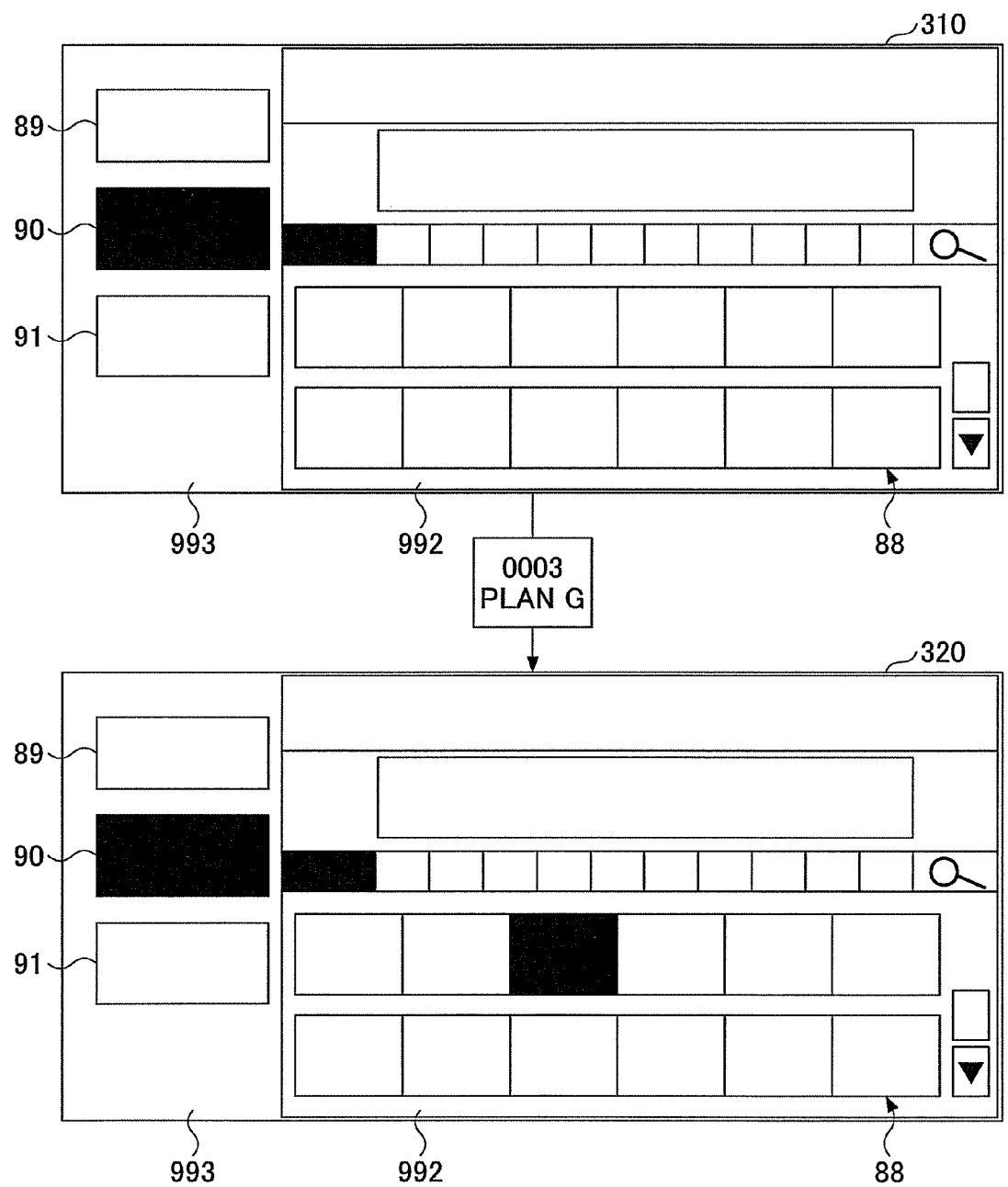
FIG. 16 is a schematic diagram illustrating selection screens for selecting a transmission unit according to an embodiment of the present invention.

FIG. 16 is a schematic diagram illustrating selection screens 310 and 320 for selecting a transmission unit according to an embodiment of the present invention. In FIG. 16, like components are denoted with like reference numerals as those of the embodiment illustrated in FIG. 16 and are not further explained. In the transmission unit designation column 993 of the selection screen 310 illustrated in FIG. 16, the "user setting" key 90 is selected by the operator. Therefore, FIG. 16 shows the "user setting" key 90 displayed in an inverted manner. Further, in a case where the operator selects "plan G" of the "group selection" keys 88, "plan G" key of the "group selection" keys 88 is displayed in a selection screen 320 in an inverted manner.

In a case where the "user setting" key 90 is selected, the transmission unit selection screen 220 is not displayed because a specific transmission unit is set in the "priority" column of the "user data" (also referred to as "prioritized transmission unit").

When the operator commands execution of a document scanning process where the "user setting" key is selected, transmission data are transmitted by the prioritized transmission unit (i.e. transmission unit set in the "priority" column of the "user data") to the member "plan G". Therefore, in the embodiment of FIG. 16, the operator does not need to select a transmission unit from the transmission unit selection screen 220.

Figure 17:
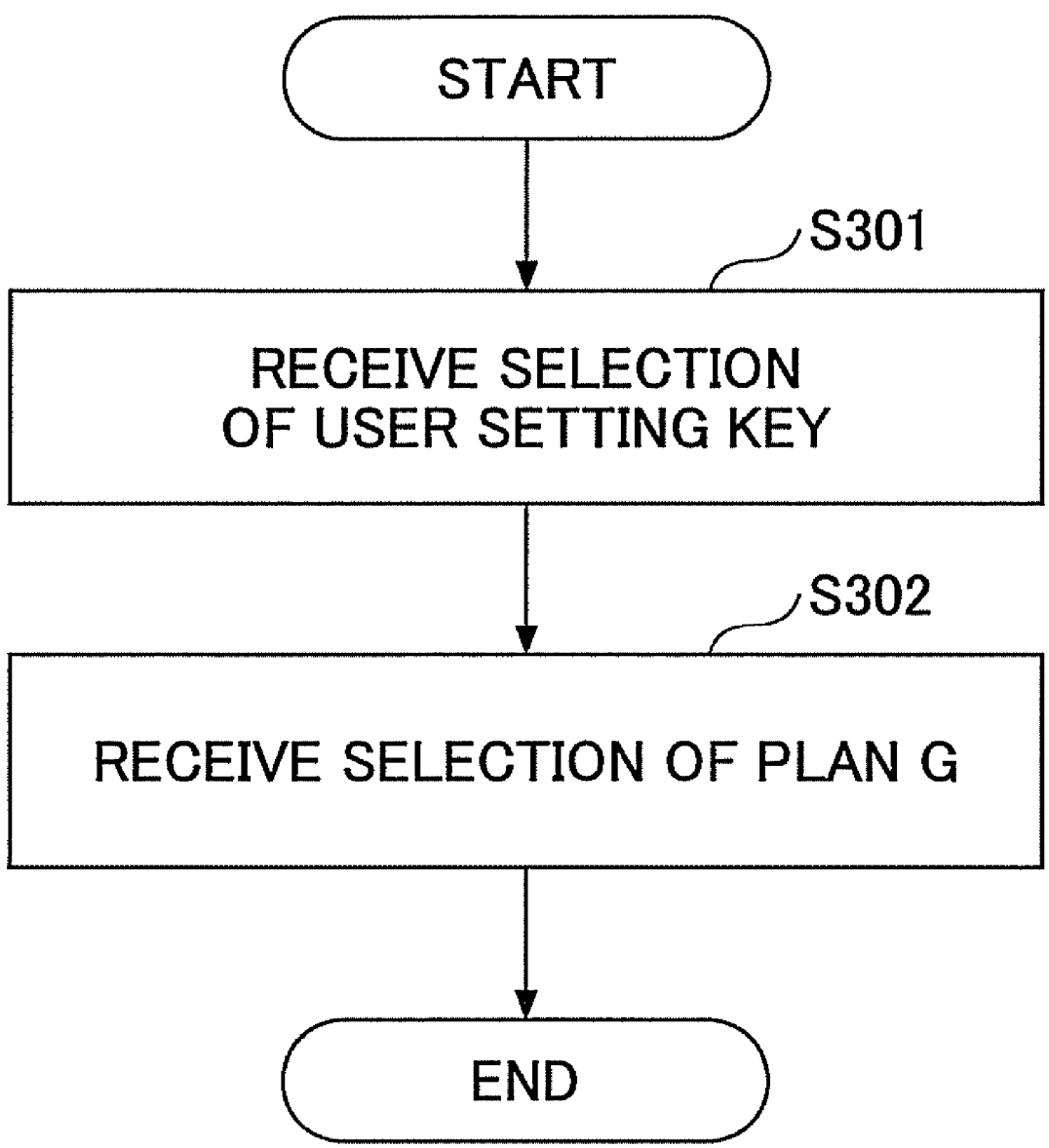
FIG. 17 is a flowchart illustrating procedures for selecting a prioritized transmission unit according to an embodiment of the present invention.

FIG. 17 is a flowchart illustrating procedures for selecting the prioritized transmission unit according to an embodiment of the present invention. The user data utilization part 75 receives data indicating selection of the "user setting" key 90 selected from the selection screen 310 by the operator (Step S301). The user data utilization part 75 also receives data indicating selection of the "plan G" key selected from the selection screen 310 by the operator (Step S302). Thereby, the user data utilization part 75 obtains the ID of the "plan G" and transmission unit data that identify the prioritized transmission unit (i.e. transmission unit set in the "priority" column of the "user data"). Then, the user data utilization part 75 transmits the obtained ID and the transmission unit data to the user data management part 76. Then, the user data management part 76 searches for a matching group based on the obtained transmission unit data.

Figure 18:
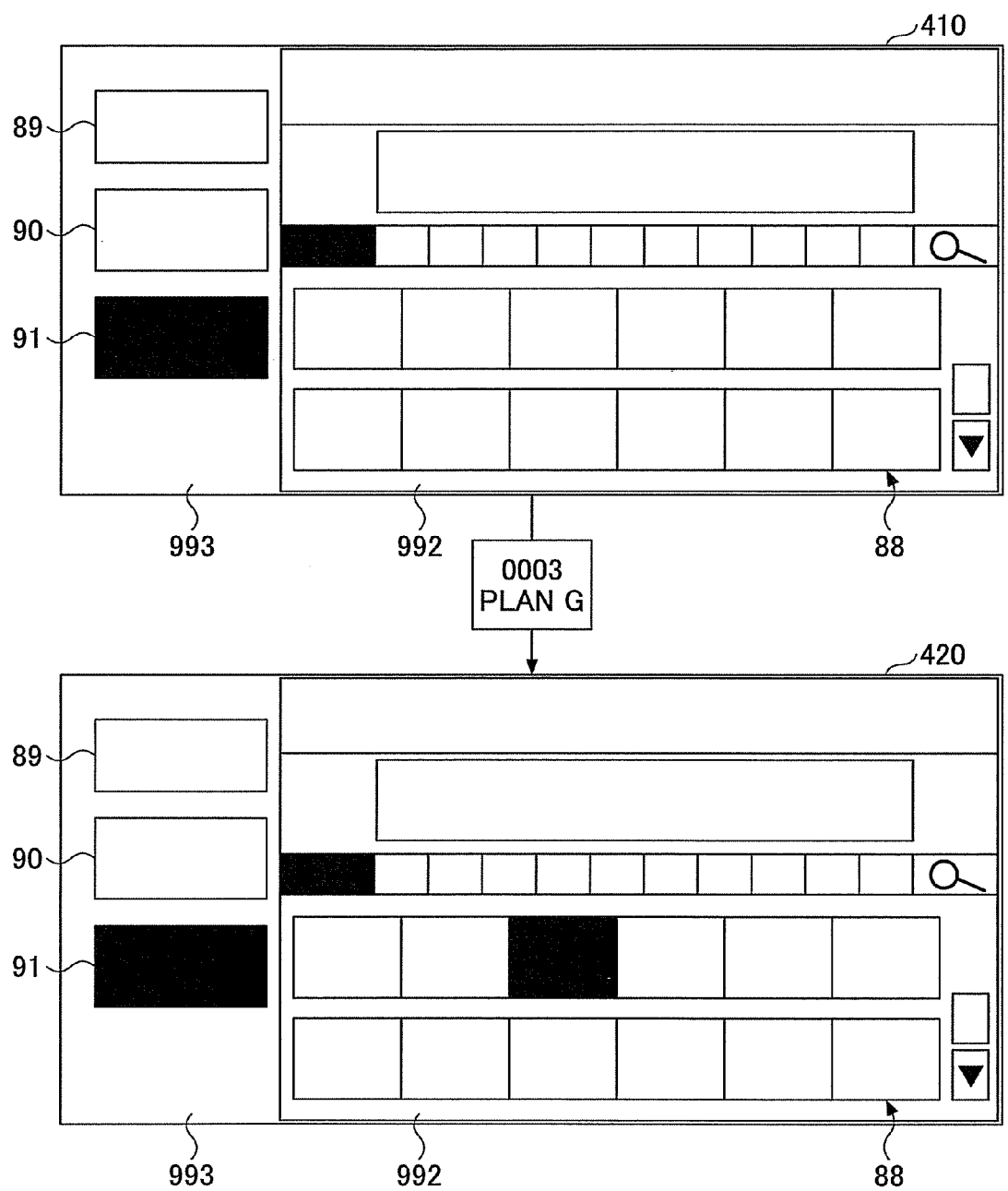
FIG. 18 is a schematic diagram illustrating selection screens for selecting a transmission unit according to an embodiment of the present invention.

FIG. 18 is a schematic diagram illustrating selection screens 410 and 420 for selecting a transmission unit according to an embodiment of the present invention. In FIG. 18, like components are denoted with like reference numerals as those of the embodiment illustrated in FIG. 14 and are not further explained. In the transmission unit designation column 993 of the selection screen 410 illustrated in FIG. 18, the "group designation" key 91 is selected by the operator. Therefore, FIG. 18 shows the "group designation" key 91 displayed in an inverted manner. Further, in a case where the operator selects "plan G" of the "group selection" keys 88, the "plan G" key of the "group selection" keys 88 is displayed in a selection screen 420 in an inverted manner. In a case where the "group designation" key 91 is selected, the transmission unit selection screen 220 is not displayed because a specific transmission unit is set in the "priority" column of the "user group" (also referred to as "prioritized transmission unit").

When the operator commands execution of a document scanning process where the "user setting" key is selected, transmission data are transmitted by the prioritized transmission unit (i.e. transmission unit set in the "priority" column of the "user group") to the member "plan G". Therefore, in the embodiment of FIG. 18, the operator does not need to select a transmission unit from the transmission unit selection screen 220.

Figure 19:
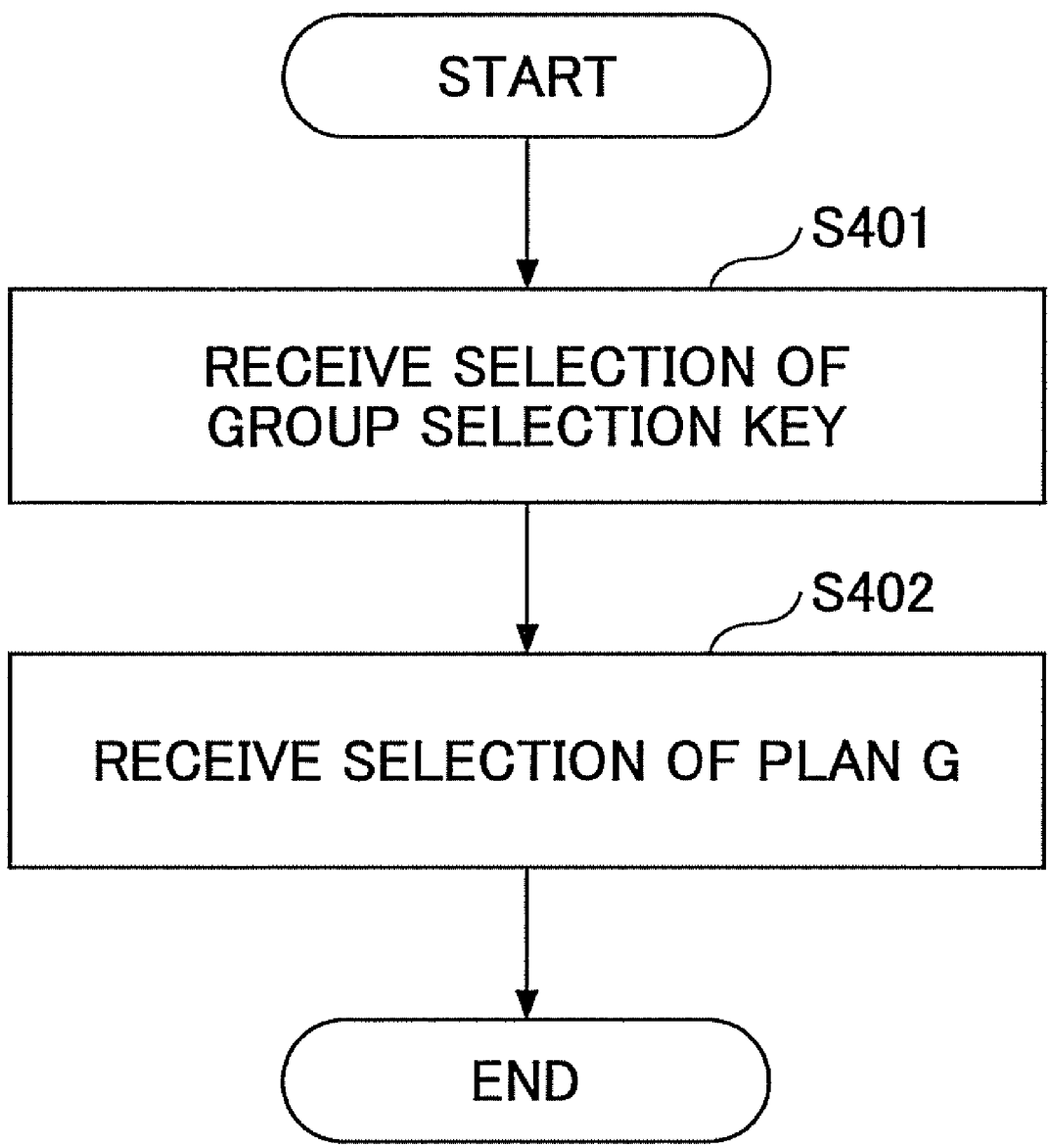
FIG. 19 is a flowchart illustrating procedures for selecting a prioritized transmission unit according to an embodiment of the present invention.

FIG. 19 is a flowchart illustrating procedures for selecting the prioritized transmission unit according to an embodiment of the present invention. The user data utilization part 75 receives data indicating selection of the "group designation" key 90 selected from the selection screen 410 by the operator (Step S401). The user data utilization part 75 also receives data indicating selection of the "plan G" key selected from the selection screen 410 by the operator (Step S402). Thereby, the user data utilization part 75 obtains the ID of the "plan G" and transmission unit data that identify the prioritized transmission unit (i.e. transmission unit set in the "priority" column of the "user group"). Then, the user data utilization part 75 transmits the obtained ID and the transmission unit data to the user data management part 76. Then, the user data management part 76 searches for a matching group based on the obtained transmission unit data.

The image forming apparatus 100 not only can transmit transmission data to a user by selecting a user group of the user but can also transmit transmission data to a user by selecting the user.

Figure 20:
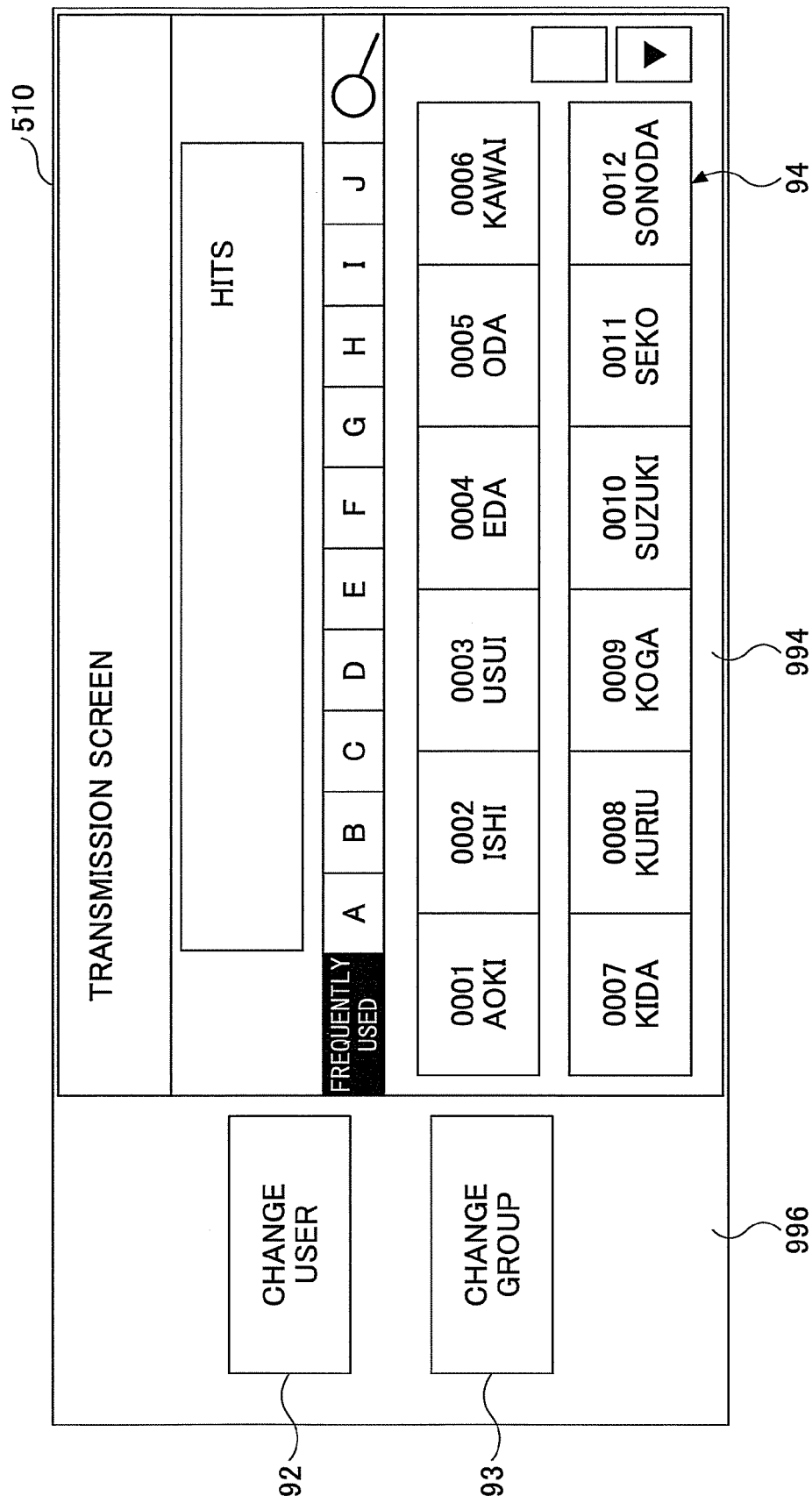
FIG. 20 is a schematic diagram illustrating an example of a transmission screen in a case where a user is selected according to an embodiment of the present invention.

FIG. 20 illustrates an example of a transmission screen 510 in a case where a user is selected. The user selection screen 510 includes a user group selection column 996 and a user selection column 994. The user group selection column 996 includes a "user change" key 92 and a "group change" key 93. The user selection column 994 includes "user selection" keys 94 corresponding to the users. FIG. 20 illustrates a state where the "user change" key 92 is selected.

In a case where the operator selects one or more users from the user selection column 994, the user data utilization part 75 obtains an ID(s) of the selected user(s) (ID of user data). Then, the user data utilization part 75 transmits the obtained ID to the user data management part 76. Then, the user data management part 76 searches for a user that matches the ID in the user data DB 80 and obtains an attribute name and an attribute of the user matching the ID. Then, the user data management part 76 sends the obtained attribute name and the attribute to the user data utilization part 75.

The following methods (i) and (ii) are methods for designating a transmission unit with the user selection screen 510.
(i) transmitting transmission data to a user with a transmission unit set in the "priority" column of "user data" (prioritized transmission unit")
(ii) transmitting transmission data to a user with all transmission units registered in the attribute of "user data"

Figure 21:
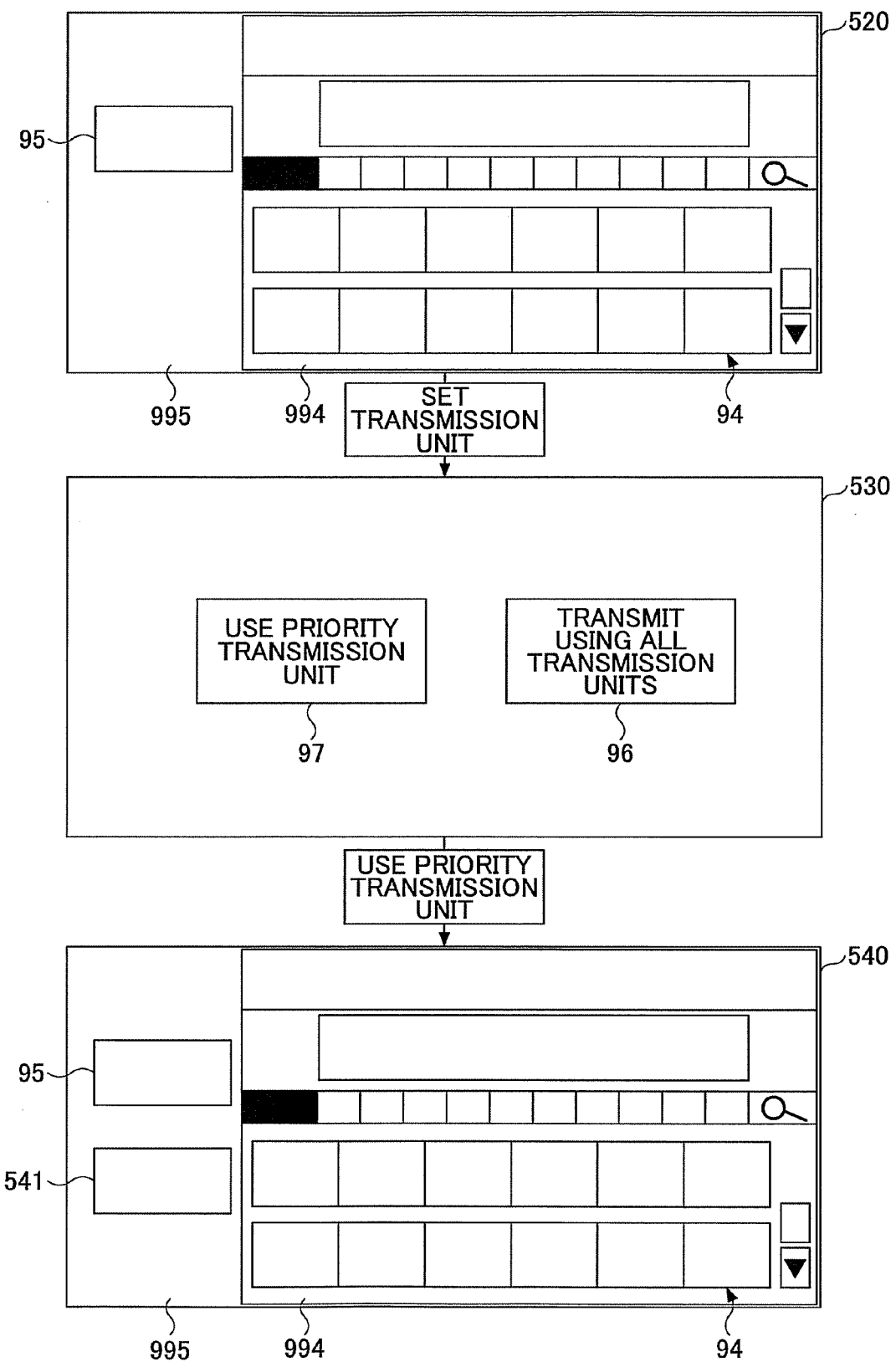
FIG. 21 is a schematic diagram for describing selection of method for designating a transmission unit according to an embodiment of the present invention.

FIG. 21 is a schematic diagram for describing the selection of either one of the methods (i) and (ii) according to an embodiment of the present invention. A user selection screen 520 includes a transmission unit setting column 995 and a user selection column 994. In a case where the operator selects the "transmission unit setting" key 95 in the user selection screen 520, the user data utilization part 75 receives data indicating selection of the "transmission unit setting" key 95. The user data utilization part 75 generates data of a transmission unit setting screen 530 and displays the transmission unit setting screen 530 according to the generated data.

A "use prioritized transmission unit" key 97 and a "transmit using all transmission units" key 96 are displayed in the user setting screen 530. The operator selects one of the keys 96 or 97. FIG. 21 illustrates a case where the "use prioritized transmission unit" key 97 is selected. The user data utilization part 75 receives data indicating selection of the "use prioritized transmission unit" key 97 and displays a transmission unit setting screen 540. The user data utilization part 75 displays a message 541 in the transmission unit setting screen 540. The message 541 indicates that the "use prioritized transmission unit" is selected.

In a case where the "user selection" key 94 is selected, the user data utilization part 75 obtains an ID of the user. The user data utilization part 75 transmits the obtained ID to the user data management part 76. Then, the user data management part 76 searches for a user that matches the ID in the user data DB 80 and obtains an attribute name (transmission unit set in the "priority" column of "user data" (prioritized transmission unit")) of the user matching the ID. Then, the user data management part 76 sends the obtained attribute name to the user data utilization part 75. Thereby, the user data utilization part 75 can transmit transmission data to the transmission unit set in the "priority" column of "user data".

In a case where the "transmit using all transmission units" key 96 is selected, the user data management part 76 obtains data of all transmission units set in the "attribute" column of the user data of the selected user from the user data DB 80 and sends the obtained data of all of the transmission units to the user data utilization part 75. Accordingly, the user data utilization part 75 can transmit transmission data with all transmission units set in the "attribute" column of the "user data".

With the embodiment illustrated in FIG. 21, the degree of freedom is increased by allowing the operator to select the method of designating the transmission unit for transmitting transmission data to the user. Further, the operator can decide whether to transmit transmission data with a single transmission unit or with all transmission units each time of transmitting transmission data even in a case where the user is the same. For example, important data can be transmitted using all of the transmission units of the image forming apparatus 100.

In a case where transmission data are transmitted to a single user using all of the transmission units of the image forming apparatus 100 by using the method (ii), it may be troublesome for the user to receive the same transmission data for the same number of times. Therefore, the following method (iii) may be used with the image forming apparatus 100 for designating a transmission unit. (iii) transmitting transmission data to a user with all of the transmission units in an order in which the transmission units are registered in the attribute of "user data" but terminating transmission of transmission data when transmission using one of the transmission units is completed (successful).

Figure 22:
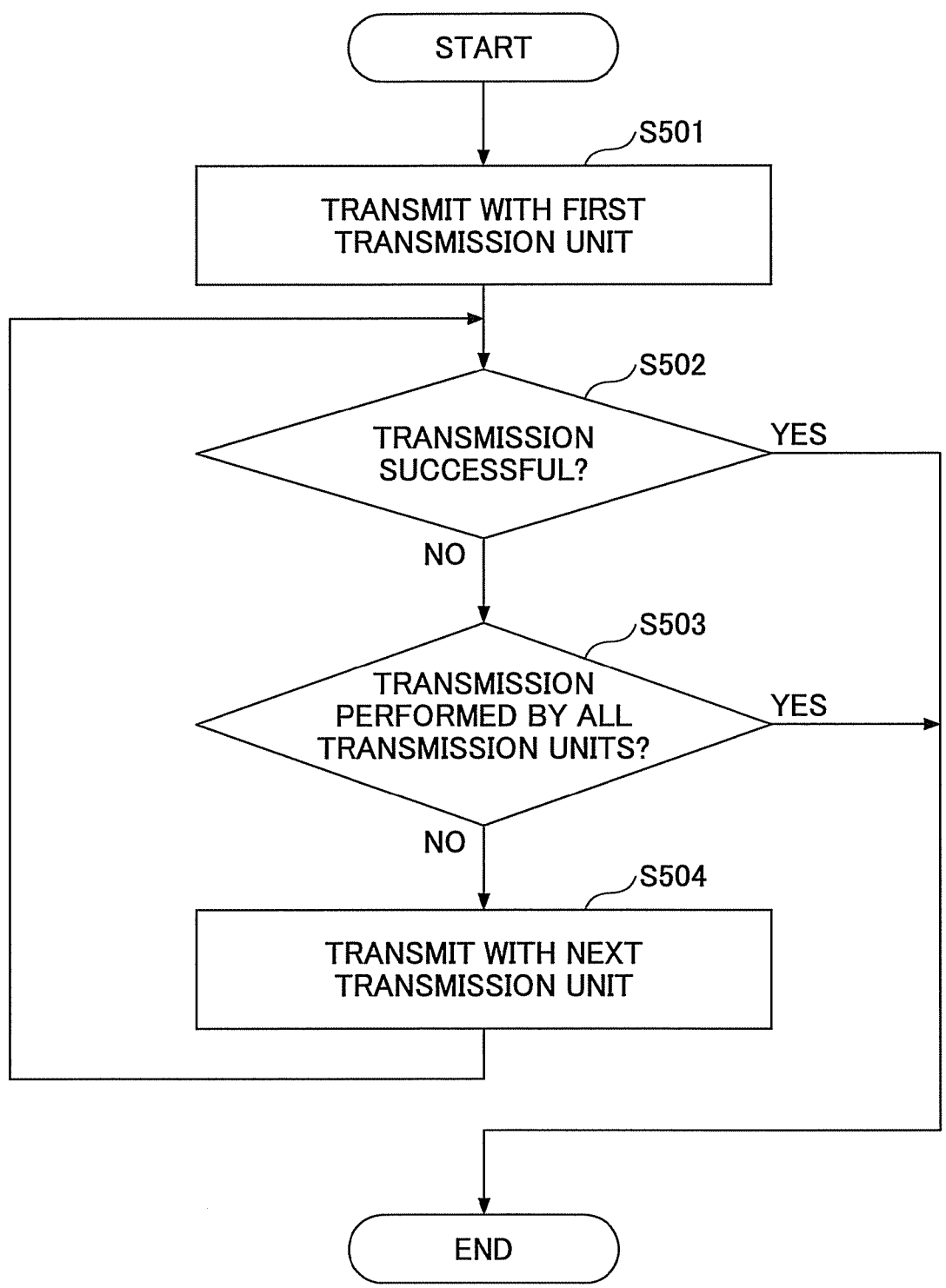
FIG. 22 is a flowchart illustrating procedures of transmitting transmission data using a method of transmitting transmission data to a user with all of the transmission units in an order in which transmission units are registered in an attribute of "user data" but terminating transmission of transmission data when transmission using one of the transmission units is completed according to an embodiment of the present invention.

FIG. 22 is a flowchart illustrating procedures of transmitting transmission data using the method (iii) according to an embodiment of the present invention. In FIG. 22, it is supposed that the user data utilization part 75 has already obtained data of all of the transmission units of the image forming apparatus 100 registered to the attribute of "user data" from the user data management part 76.

Among the data of the transmission units obtained from the user data management part 76, the user data utilization part 75 transmits transmission data to a user using a first transmission unit (Step S501). The first transmission unit may be, for example, a transmission unit set in a "priority" column of the user data. In another example, the first transmission unit may be a transmission unit which successfully transmitted transmission data at a previous time of transmitting transmission data. In yet another example, the first transmission unit may be a transmission unit for which it is easy to determine the success of transmission.

Then, the user data utilization part 75 determines whether transmission is successful (Step S502). The method of determining whether transmission is successful differs depending on the transmission unit. In a case where the transmission unit is "fax", the user data utilization part 75 determines that transmission is successful when receiving data indicating successful transmission from a facsimile machine of the user (counterpart receiving the transmission). In a case where the transmission unit is "folder", the user data utilization part 75 determines that transmission is successful when receiving data indicating successful storage from an OS of the PC of the user. In a case where the transmission unit is "mail", the user data utilization part 75 determines that transmission is successful when not receiving data (mail) indicating transmission failure from a mail server. In a case where the transmission unit is "mail", a substantial amount of time after the transmission is given for determining whether transmission is successful because it takes some time to receive a notice (mail) indicating transmission failure from the mail server.

In a case where transmission is successful (Yes in Step S502), the user data utilization part 75 terminates transmission of transmission data. Thereby, transmission data can be transmitted to a single user by using a single transmission unit.

In a case where transmission is unsuccessful (No in Step S502), the user data utilization part 75 determines whether transmission is performed by all of the transmission units (Step S503). In a case where transmission is performed by all of the transmission units (Yes in Step S503), the operation of FIG. 22 is terminated because there is no other transmission unit.

In a case where transmission is not performed by all of the transmission units (No in Step S503), the user data utilization part 75 performs transmission by using the next transmission unit (Step S504). Then, the processes on and after Step S502 are repeated.

Next, 3 methods for registering a group are described. In this embodiment, data of an attribute (destination data) are already registered.

(I) A Method of Registering a Group at the Time of Registering a Group

At the time when the operator registers a group, the operator can set a user group or a destination group for the group.

(II) A Method of Registering a Group at the Time of Registering a Member

At the time when the operator registers a member, the operator can set an attribute for each entry.

(III) Another Method of Registering a Group at the Time of Registering a Member

At the time when the operator registers a member, the operator can select an entry after selecting an attribute.

Figure 23:
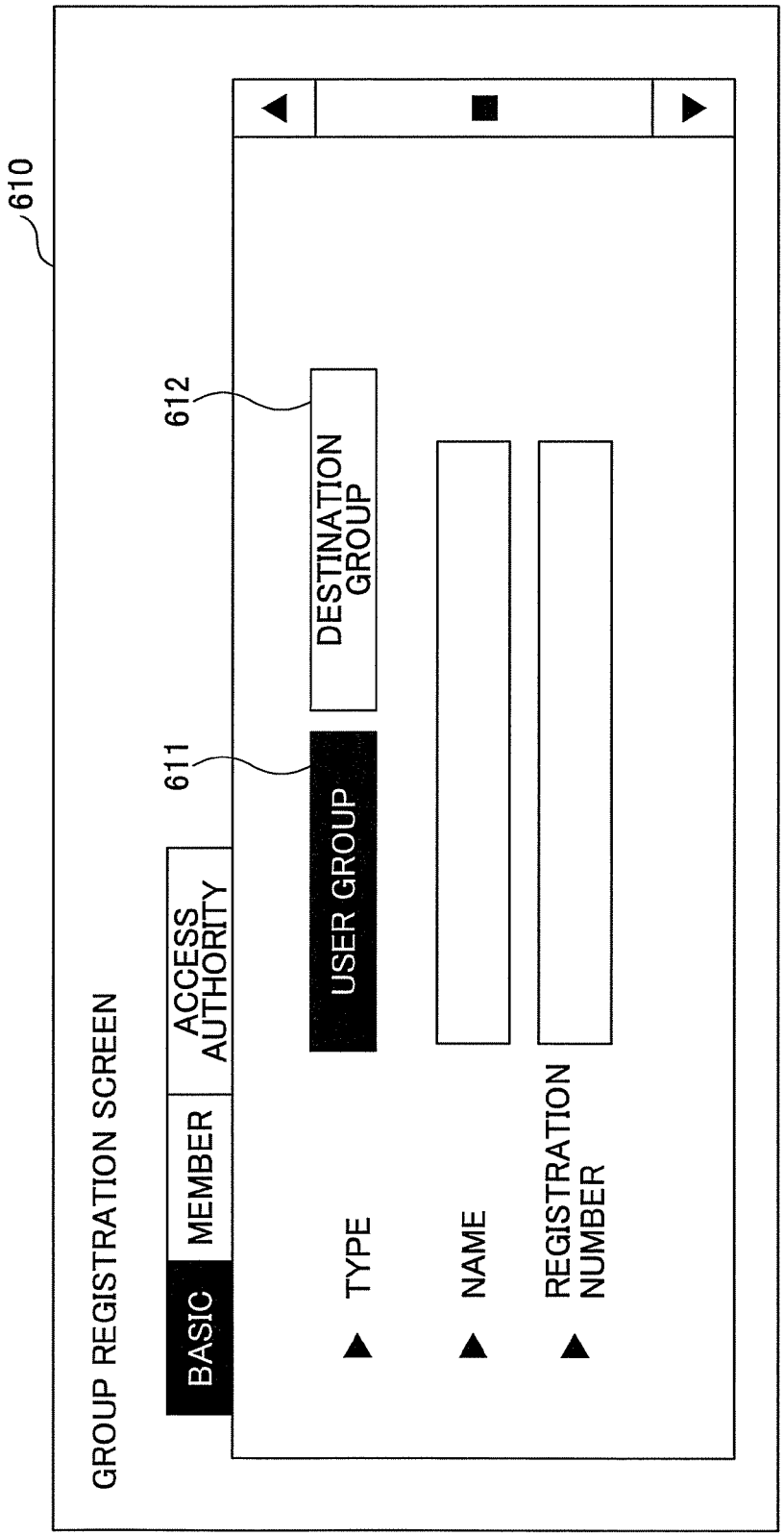
FIG. 23 is a schematic diagram illustrating an example of a group registration screen used for a method of registering a group at a time of registering a member according to an embodiment of the present invention.

FIG. 23 illustrates an example of a group registration screen 610 used for the method (I). The user data registration part 78 displays the group registration screen 610 in response to an operation performed on the control part 14 by the operator.

The group registration screen 610 is organized by a "basic" tab, a "member" tab, and an "access authority" tab. FIG. 23 illustrates a state where the "basic" tab is selected. The "basic" tab of the group registration screen 610 includes a "type" selector, a "name" field, and a "registration number" field. The "type" selector is for selecting either a "user group" or a "destination group". The "name" field is for inputting a group name. The "registration number" field is for inputting a registration number.

In the case where the operator selects "user group" from the "type" selector, the operator then selects the "member" tab. Then, the operator selects or inputs a member. Thereby, the selected or input member belongs to a user group. In a case where the operator selects "destination group" from the "type" selector, the operator then selects the "member" tab. Then, the operator selects or inputs a member. Thereby, the selected or input member belongs to a destination group. That is, in a case of registering a group, the operator can set a member in a user group or a destination group. As described above, the user data setting part 78 sends user data of the selected user group or destination group to the user data management part 76. The user data management part 76 adds the user data to the user data DB 80 or changes the user data in the user data DB 80.

It is to be noted that the operator may select a member (user and attribute name) from the members already registered in the user data DB 80. In this case, the operator does not need to input a member.

FIG. 24 illustrates an example of a group member registration screen 620 used for the method (II). The user data registration part 78 displays the group member registration screen 620 in response to an operation performed on the control part 14 by the operator.

In the group member registration screen 620, "registration name", "name", "name pronunciation", "login name", and "transmission unit when destination group is selected" are displayed in correspondence with each entry. For example, the operator can register an attribute when generating data of a destination group by selecting a "registration number" and selecting a transmission unit from "transmission unit when destination group is selected". More specifically, when the operator selects "mailaddress@dummy.com" in a state where the registration number "001" is selected, "mailaddress@dummy.com" is registered in the attribute of the user of registration number "001" when the data of the generation group are generated. In this case, registration number "001" and "mailaddress@dummy.com" are registered in "member" in a case where the destination group has the configuration of FIG. 8A or 8B.

In another example, when the operator selects "mailaddress@dummy.com" and "00451234567" in a state where registration number "001" is selected, "mailaddress@dummy.com" and "00451234567" are registered in the attribute of the user of the registration number "001". The user data setting part 78 transmits the attribute name(s) of each member to the user data management part 76. The user data management part 76 adds the members and the attribute names to the destination group of the user data DB 80.

In a case where the destination group has the configuration of FIG. 8A, a combination of "001" and "mailaddress@dummy.com" and a combination of "001" and "00451234567" are registered in the "member". In a case where the destination group has the configuration of FIG. 8B, "mailaddress@dummy.com" and "00451234567" are registered in the "001" of the "member".

In a case where the operator selects an entry having a single transmission unit, the single transmission unit becomes the member of the destination group. For example, in a case where a user of registration number "003" is selected, "003" and "00451234567" are registered in the "member" in a case where the destination group has the configuration of FIG. 8A or 8B.

With the registration method described with FIG. 24, transmission units of a member of a destination group can be positively registered one by one.

FIG. 25 illustrates an example of a group member registration screen 630 used for the method (III). The user data registration part 78 displays the group member registration screen 630 in response to an operation performed on the control part 14 by the operator.

A "mail" key 631, a "fax" key 632, and a "folder" key 633 are displayed on the group member registration screen 630 for enabling the operator to select a transmission unit at the time of selecting a destination group. Further, "registration number", "name", "name pronunciation", and "login name" are displayed in correspondence with reach entry. FIG. 25 illustrates a state where the "mail" key 631 is selected.

When the operator selects "registration number" in a state where the "mail" key 631 is selected, an attribute at the time when data of the destination group are generated can be set in attribute name "mail". For example, in a case where the operator selects registration number "001", "mailaddress@dummy.com" is registered in the attribute of the user of registration number "001" at the time of generating data of the destination group. In a case where the destination group has the configuration of FIG. 8A or 8B, "001" and "mailaddress@dummy.com" are registered in "member".

When the operator selects registration numbers "001" and "003" in a state where the "fax" key 632 is selected, "004512345567" is registered in the attribute of the user of registration number "001" and "00451234567" is registered in the attribute of the user of registration number "003", when data of the destination group are generated. The user data setting part 78 adds the member and the attribute name to the user data DB 80.

With the registration method described with FIG. 25, plural entries can be selected with respect to a single transmission unit. Therefore, members can be efficiently registered in a destination group.

Next, an operation of searching for a destination group (Step S205 of FIG. 15) according to an embodiment of the present invention is described. In a case of searching for a destination group, an attribute of an entry being set as a member and a portion of representative attributes are used as the targets of the search. The "representative attributes" include, for example, a name, a registration number, and a display name (login name).

FIGS. 26-30 are for describing screens 710-750 used for performing the search according to an embodiment of the present invention. FIG. 31 is a table for describing search conditions of the search according to an embodiment of the present invention. The user data utilization part 75 displays the search condition setting screen 710 in response to an operation performed by the operator. The search condition setting screen 710 includes a "search condition" key, 711, a "maximum hits" key 712, a "condition applying method" 713, a "sorting condition" key 714, an "access authority filter" 715, and an "execute search" key 716. The user data utilization part (transmission application) 75 receives data indicating a selection corresponding to a key selected by the operator.

When the user data utilization part 75 receives data indicating data indicating a selection of the "search condition" key 711, the user data utilization part 75 displays a search condition screen 720. The search condition screen 720 includes search condition items such as "attribute", "key", "determination range", "fuzzy search", and "designate search condition". Plural of the search conditions can be set.

The item "attribute" indicates attribute names of attributes used as search conditions. For example, the item "attribute" indicates a "name" key 721, a "mail" key 722, a "fax" key 723, and a "folder" key 724. In a case where the search is executed using the user data utilization part (transmission application) 75, the operator selects one of the attribute names or a prioritized attribute name is selected.

The field 725 of item "key" includes a field for inputting a character, a numeral, and a symbol. For example, the operator may input, for example, characters "ohtani", "@aaa", "bb", "c" by using the hard key 14*b*. The item "key" and the following setting items may or may not be set as search conditions.

The item "determination range" is for designating the method of applying the item "key". The operator selects "prefix match" 726, "perfect match" 727, "suffix match" 728, "partial match" 729, "equal to or greater than" 730, "equal to or less than" 731, "prefix match" 732, a "suffix match" 733, "no prefix match" 734, "no match" 735, "no suffix match"

736, or a "not included" 737 as a range for performing the search with the data input in the item "key".

The item "fuzzy search" is for designating whether to use a fuzzy search function. In a case of using the fuzzy search function a "valid" key 738 is selected. In a case of not using the fuzzy search function an "invalid" key 739 is selected. The valid and invalid keys 738, 739 are ignored in a case where "equal to or greater than" or "equal to or less than" of the determination range is selected. "The item "search condition designation" item is for designating how the search conditions are applied. For example, in a case where the operator has input plural keys, the operator can designate how the plural keys are selected.

Figure 28:
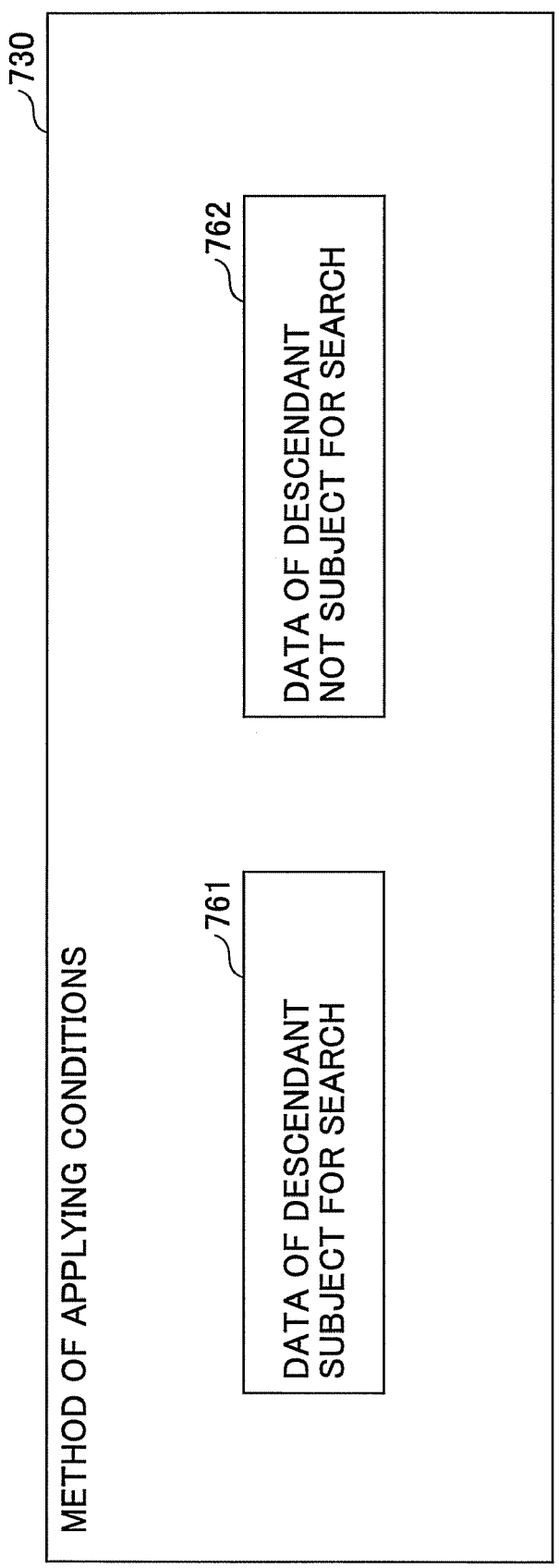
FIG. 28 is a schematic diagram illustrating another screen (condition applying method screen) used for performing a search according to an embodiment of the present invention.

As illustrated in FIG. 28, in a case where the user data utilization part 75 receives data indicating a selection of the "condition applying method", the user data utilization part 75 displays a condition applying method screen 730. The condition applying method screen 730 includes a "data of descendant subject for search" key 761 and a "data of descendant not subject for search" key 762. One of the keys 761 and 762 is selected for designating how to handle data of a descendent of a member belonging to a group when filtering entries at the time of conducting the search. For example, when "an entry including an attribute name "mail" is set as a search condition in a case where the target of the search is a destination having an attribute name "mail" as a member of a group, a group of the member would not be found (no hit) when "data of descendant not subject for search" key 762 is selected whereas a screen of a group would be found (hit) when "data of descendant not subject for search" key 762 is not selected.

Figure 29:
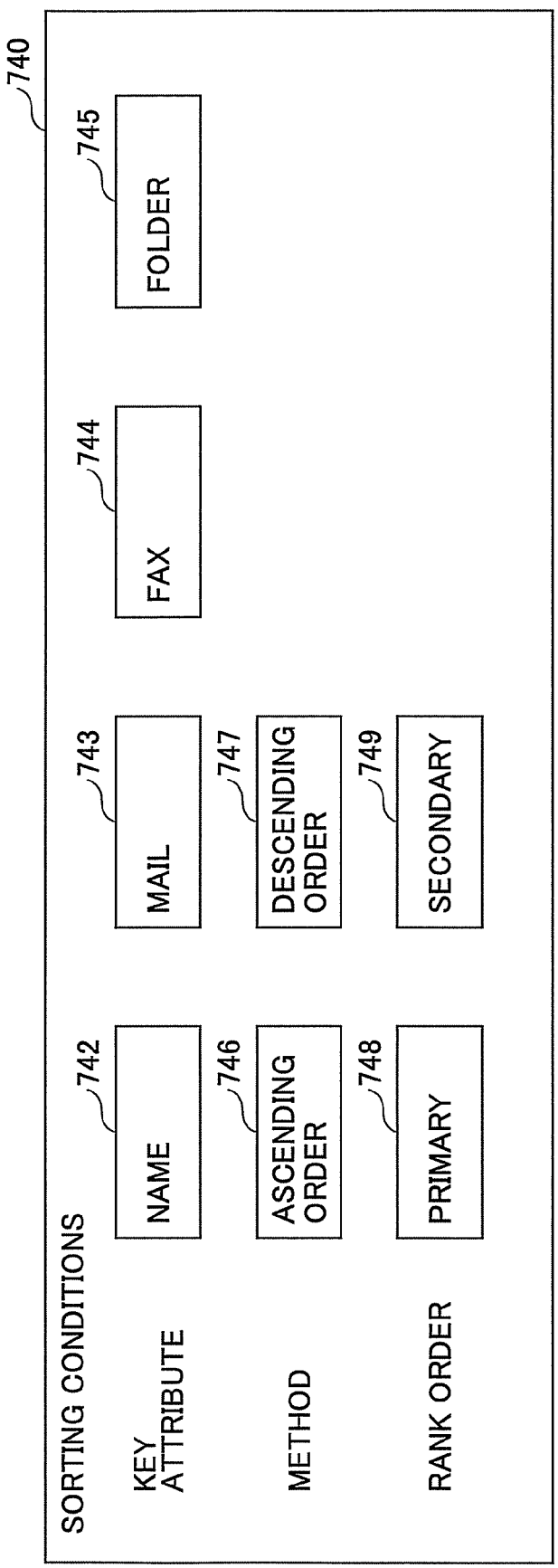
FIG. 29 is a schematic diagram illustrating another screen (sort condition screen) used for performing a search according to an embodiment of the present invention.

As illustrated in FIG. 29, in a case where the user data utilization part 75 receives data indicating a selection of the "sorting condition" key 714, the user data utilization part 75 displays a sorting condition screen 740. In this example, two sorting conditions can be selected. The operator can select attributes to be used for a sorting process from a "name" key 742, a "mail" key 743, a "fax" key 744, and/or a "folder" key 745 included in a "key attribute" item. The sorting condition screen 740 also includes setting items "sorting condition" and "sorting order". The operator can select an "ascending order" key 746 or a "descending order" key 747 included in the "sorting condition" item. The operator can also select a "primary" key 748 or a "secondary" key 749 included in the "sorting order" key.

Figure 30:
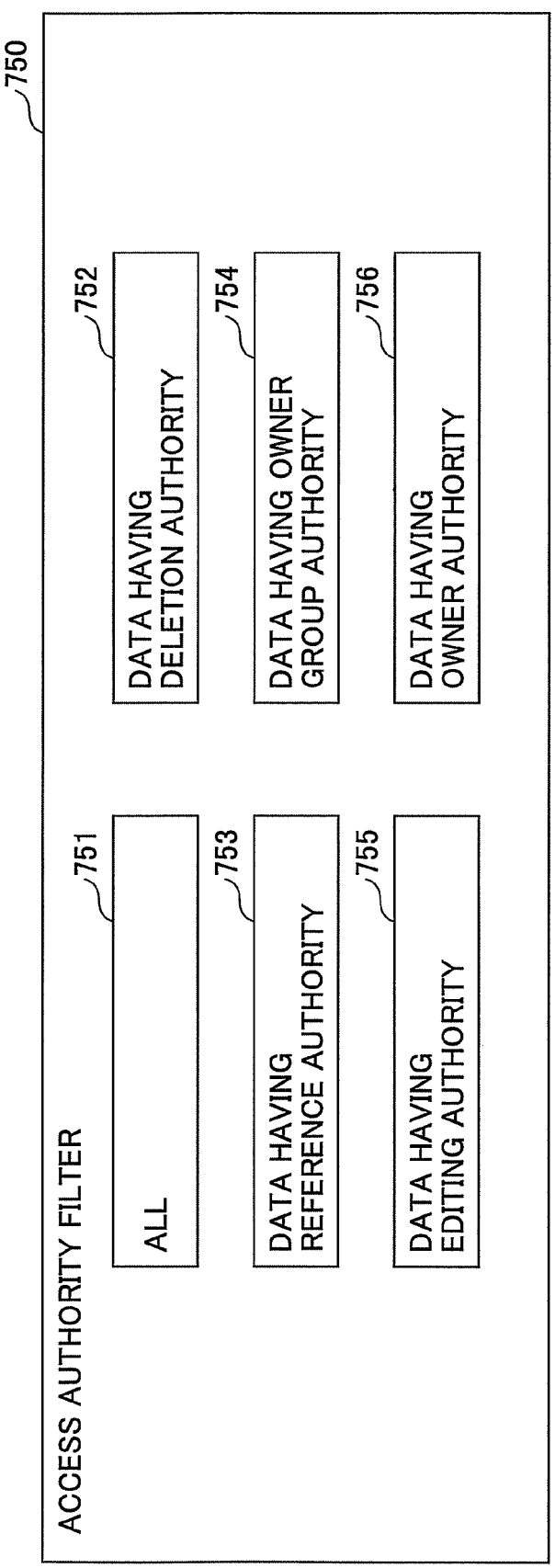
FIG. 30 is a schematic diagram illustrating another screen (access authorization filter screen) used for performing a search according to an embodiment of the present invention.

As illustrated in FIG. 30, in a case where the user data utilization part 75 receives data indicating a selection of the "access authority filter" 715, the user data utilization part 75 displays an access authority filter screen 750. The access authority filter screen 750 includes an "all" key 751, a "data having deletion authority" key 752, a "data having reference authority" key 753, a "data having owner group authority" key 754, a "data having editing authority" key 755, and a "data having owner authority" key 756. The operator can filter attributes to be subjected to the search according to access authority.

The "maximum hits" key 712 (see, FIG. 26) is for setting the maximum number of users that could be hit by executing the search. The number of "maximum hits" can be set at the discretion of the operator.

Figure 26:
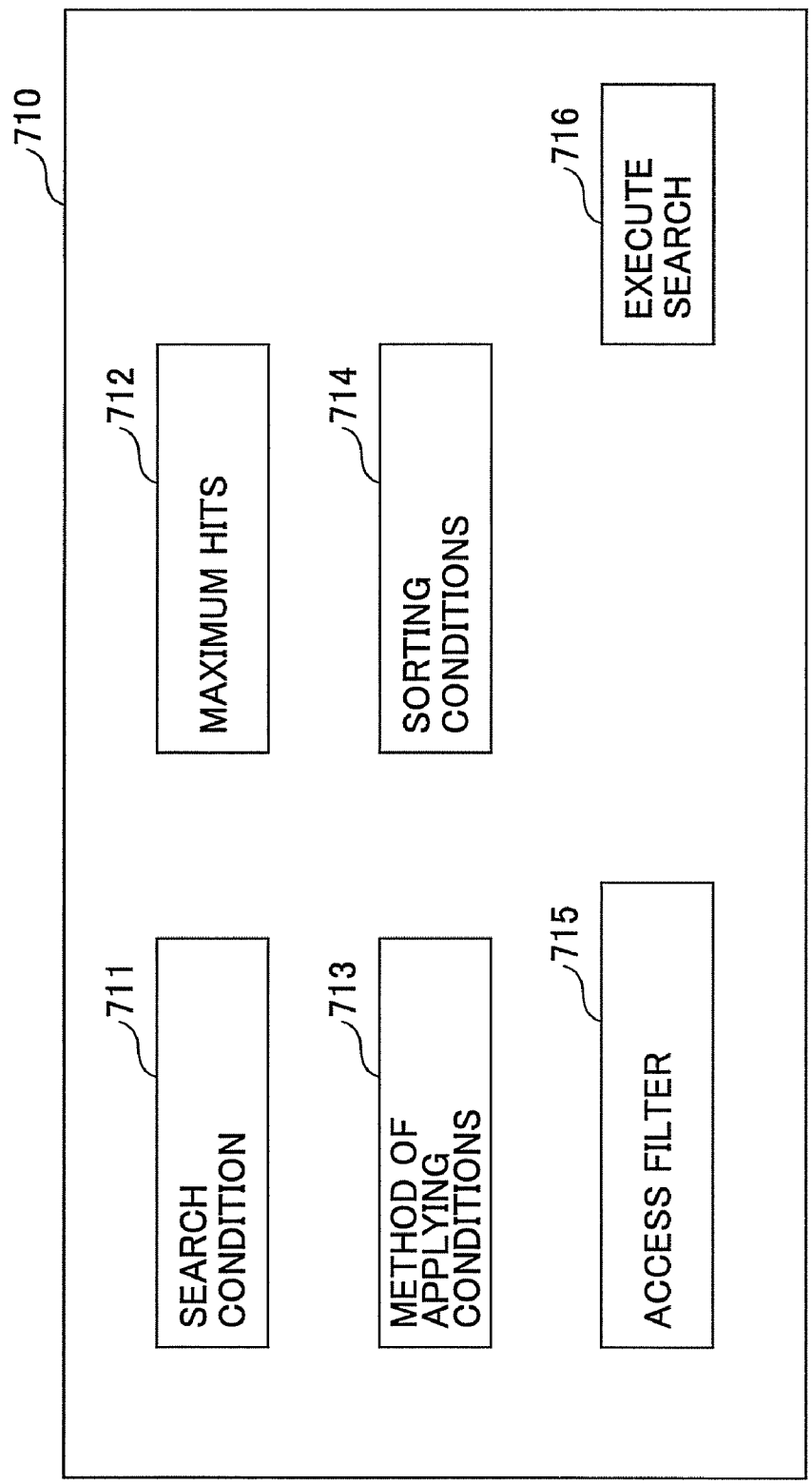
FIG. 26 is a schematic diagram illustrating a screen (search condition setting screen) used for performing a search according to an embodiment of the present invention.
Figure 27:
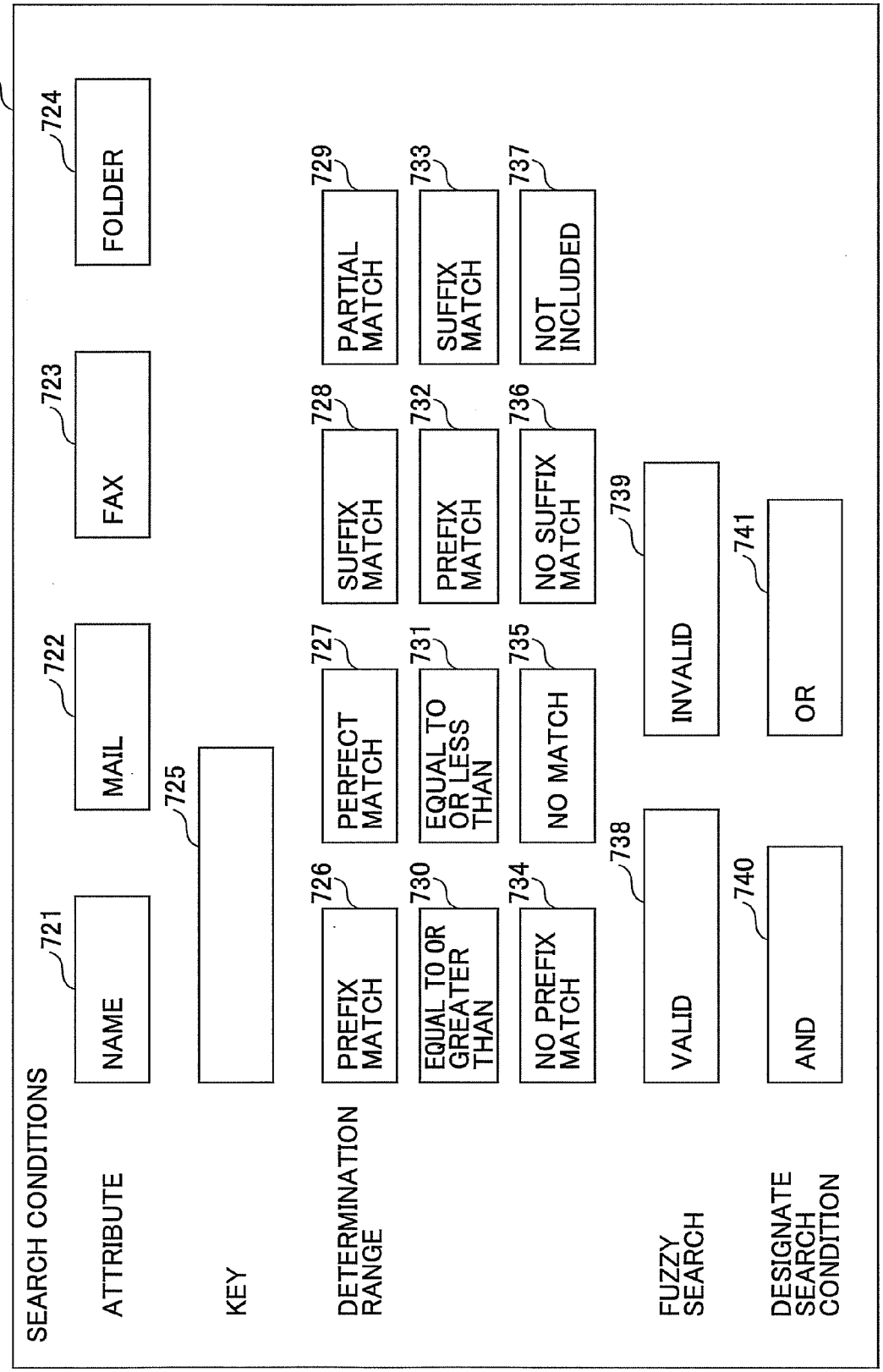
FIG. 27 is a schematic diagram illustrating another screen (search condition screen) used for performing a search according to an embodiment of the present invention.

As illustrated in FIG. 26, the user data utilization part 75 not only receives data indicating search conditions but also receives data indicating a selection of the "execute search" key 716 after search conditions have set in the search condition setting screen 710. The user data utilization part 75 sends the search conditions to the user data management part 76.

FIG. 31 is basically a summary of the conditions and FIG. 32 is a flowchart illustrating procedures for searching for a destination group within user data according to an embodiment of the present invention.

The user data management part 76 extracts (reads out) a first data item from the user data DE 80 (Step S601). Then, the user data management part 76 determines whether the extracted data item is data of a group (Step S602).

In a case where the extracted data item is not data of a group (No in Step S602), the extracted data item is user data having a configuration of FIG. 8D. Accordingly, the user data management part 76 determines whether the extracted data item matches a search condition (Step S616). For example, in a case where the attribute name of the search condition is "mail" and no particular "key" is set, data having an attribute name "mail" would match the search condition.

In a case where there is a match (Yes in Step S616), the user data management part 76 adds the data matching the search condition to a search result (Step S617). The search result may be, for example, an ID of a member, a name of a member, an attribute of the matching attribute name (e.g., in a case where the attribute name is "mail", the attribute would be an e-mail address).

In a case where there is no match (No in Step S616), the user data management part 76 determines whether a next data item is included in the user data stored in the user data DB 80 (Step S612). In a case where the next data item is included in the user data stored in the user data DB 80 (Yes in Step S612), the user data management part 76 extracts (reads out) the next data item from the user data DB 80 (Step S618). Then, the user data management part 76 repeats the processes performed on and after Step S602.

Returning to Step S602, in a case where the extracted first data item is group data (Yes in Step S602), the user data management part 76 increments a value of layer data for recording the layer being searched (Step S603). For example, in a case where the group has the configuration illustrated in FIG. 8A, data of ID "555" is a group.

In this example, the layer data start from "1" and are incremented/decremented one by one. In FIG. 9, the value of the layer of the ID "111" is "1". The value of the layer of IDs "222", "666", and "444" is "2".

Then, the user data management part 76 extracts (reads out) a member list immediately below the data determined as group data from the user data DB 80 (Step S605). In a case where extracted data item is data having a configuration of FIG. 8A, a member list of ID "555" is extracted.

Then, the user data management part 76 determines whether each member of the extracted member list has been searched (Step S606). As illustrated in FIG. 9, the same member may be found during the search. Therefore, the user data management part 76 performs the search while registering each member that has been searched in already-searched for data stored in, for example, another database.

In a case where the first member has already been searched (Yes in Step S606), the user data management part 76 determines whether there is another member in the member list (Step S610). In a case where there is a next member (Yes in Step S610), the user data management part 76 extracts the next member (Step S615) and repeats the process on and after Step S606.

In a case where the first member has not yet been searched (No in Step S606), the user data management part 76 determines whether the member is a group (group data) (Step S607). In a case where the first member is a group (Yes in Step S607), the user data management part 76 returns to perform the process on and after Step S603 because it is necessary to descend to a lower layer.

In a case where the first member is not a group (No in Step S607), the user data management part 76 determines whether the first member matches the search condition (Step S608). In a case where there is a match (Yes in Step S608), the user data management part 76 adds the member to the search result (Step S613). In a case where there is no match (No in Step S608), the user data management part 76 adds the member to the already-searched data stored in, for example, another database (Step S609).

Then, the user data management part 76 determines whether there is another member in the member list (Step S610). In a case where there is no next member (No in Step S610), the search of a single group is completed. When the value of the layer is "1", such value signifies that all layers have been searched. Therefore, the user data management part 76 determines whether the value of the layer is "1" (Step S611).

In a case where the value of the layer is not "1" (No in Step S611), the user data management part 76 decrements the layer data for ascending a single layer (Step S614). Then, the user data management part 76 determines whether there is another member in the member list (Step S610) and repeats the process on and after Step S615.

In a case where the value of the layer is "1" (Yes in Step S611), the user data management part 76 determines whether there are next data at the shallowest layer (Step S612). In a case where there are no next data at the shallowest layer (No in Step S612), the user data management part 76 ends the process operation illustrated in FIG. 32.

Thereby, the user data management part 76 can search for a member (user) having a desired attribute name (transmission unit) in the user data DB 80.

Hence, with the above-described embodiments of the present invention, the image forming apparatus 100 can positively designate a desired transmission unit when transmitting transmission data to a destination by using an application having plural transmission units. As a rule, the image forming apparatus 100 can designate a single transmission unit for transmitting transmission data. As an exception, the image forming apparatus 100 can also designate plural transmission units for transmitting transmission data. Thereby, the degree of freedom and convenience can be enhanced for the operator of the image forming apparatus 100.

The present invention is not limited to the specifically disclosed embodiments, and variations and modifications may be made without departing from the scope of the present invention.

The present application is based on Japanese Priority Application No. 2009-133459 filed on Jun. 2, 2009, the entire contents of which are hereby incorporated herein by reference.

What is claimed is:

1. A data processing apparatus comprising:
a plurality of transmission units configured to transmit transmission data;
a storage part configured to store a destination group table therein, the destination group table including data of one or more of the plurality transmission units associated with user data;
a reception part configured to receive selection data indicating selection of the user data the receive designation data indicating designation of the one or more of the plural transmission units, and extract the user data from the storage part according to the selection data and the designation data; and a transmission request part configured to request transmission of the transmission data to at least one of the plural transmission units according to the user data extracted by the reception part;
wherein the storage part is configured to store priority transmission unit data indicating one of the plural transmission units by which the transmission data is to be transmitted, wherein the storage part is configured to store a user group table and a combination group table therein, wherein the user group table includes the user data wherein the combination group includes a combination of the destination group table and the user group table, wherein the storage part is configured to store priority transmission unit data indicating one or more prioritized transmission units corresponding to one of the user data in the user group table, wherein the transmission request part is configured to request transmission of the transmission data to the one or more prioritized transmission units in a case where the user data extracted by the reception part includes the data indicating the one or more prioritized transmission units, and wherein the storage part is configured to store the data indicating the one or more prioritized transmission units in a predetermined order, wherein the transmission request part is configured to request transmission of the transmission data to the one or more prioritized transmission units according to the predetermined order in a case where the user data extracted by the reception part includes the data indicating the prioritized transmission unit, wherein the transmission request part cancels the request when the one or more prioritized transmission units completes transmitting the transmission data.

2. The data processing apparatus as claimed in claim 1, wherein the storage part is configured to store data of another destination group table in the destination group table, wherein the data of the other destination group table is stored as the user data of the destination group table, wherein the reception part is configured to extract the user data corresponding to the other destination group table.

3. The data processing apparatus as claimed in claim 1, wherein the storage part is configured to store data indicating one or more prioritized transmission units corresponding to all of the user data in the user group table, wherein the transmission request part is configured to request transmission of the transmission data to the one or more prioritized transmission units in a case where the user data extracted by the reception part includes the data indicating the one or more prioritized transmission units.

4. The data processing apparatus as claimed in claim 1, further comprising:
a registering part configured to receive a group selection dam indicating selection of the destination group table or the user group table store in the storage part, receive input of a new user data, and register the new user data in the destination group table or the user group table store according to the received group selection data.

5. The data processing apparatus as claimed in claim 1, further comprising a registering part Configured to display a list indicating the user data in correspondence with the data of the one or more of the plural transmission units, receive a new user data, and register the new user data in correspondence with the one or more transmission units of the destination group table.

6. The data processing apparatus as claimed in claim 1, further comprising a registering part configured to receive a plurality of new user data corresponding to one of the one or more transmission units and register the plural new user data in correspondence with the one of the one or more transmission units of the destination group table.

7. The data processing apparatus as claimed in claim 1, further comprising a searching part configured to receive search data indicating at least one of key data, maximum hit number data, or sorting condition data corresponding to user data and search the user data corresponding to the one or more of the plural transmission units stored in the storage part based on the received search data.

8. The data processing apparatus as claimed in claim 2, further comprising a searching part configured to receive search data indicating whether the data of the other destination group table are to be included in the user data to be searched and search the user data corresponding to the one or more of the plural transmission units stored in the storage part based on the received search data.

9. A data processing method for transmitting transmission data with a data processing apparatus including a plurality of transmission units, the method comprising the steps of:
  a) storing a destination group table in the data processing apparatus, the destination group table includes data of one or more of the plurality transmission units associated with user data;
  b) receiving selection data indicating selection of the user data;
  c) receiving designation data indicating designation of one or more of the plural transmission units,
  d) extracting the user data from the storage part according to the selection data and the designation data; and
  e) requesting transmission of the transmission data to at least one of the plural transmission units according to the user data extracted in step d);
  wherein step a), includes storing priority transmission unit data indicating one of the plural transmission units by which the transmission data is to be transmitted, storing a user group table and a combination group table therein, wherein the user group table includes the user data wherein the combination group includes a combination of the destination group table and the user group table, storing priority transmission unit data indicating one or more prioritized transmission units corresponding to one of the user data in the user group table, wherein the transmission request part is configured to request transmission of the transmission data to the one or more prioritized transmission units in a case where the user data extracted by the reception part includes the data indicating the one or more prioritized transmission units, and storing the data indicating the one or more prioritized transmission units in a predetermined order, wherein the transmission request part is configured to request transmission of the transmission data to the one or more prioritized transmission units according to the predetermined order in a case where the user data extracted by the reception part includes the data indicating the prioritized transmission unit, wherein the transmission request part cancels the request when the one or more prioritized transmission units completes transmitting the transmission data.

10. A non-transitory computer-readable recording medium on which a program for causing a computer to execute a data processing method for transmitting transmission data with a data processing apparatus including a plurality of transmission units, the data processing method comprising the steps of:
  a) storing a destination group table in the data processing apparatus, the destination group table including data of one or more of the plurality transmission units associated with user data;
  b) receiving selection data indicating selection of the user data,
  c) receiving designation data indicating designation of one or more of the plural transmission units,
  d) extracting the user data from the storage part according to the selection data and the designation data; and
  e) requesting transmission of the transmission data to at least one of the plural transmission units according to the user data extracted in step d);
  wherein step a) includes storing priority transmission unit data indicating one of the plural transmission units by which the transmission data is to be transmitted, storing a user group table and a combination group table therein, wherein the user group table includes the user data wherein the combination group includes a combination of the destination group table and the user group table, storing priority transmission unit data indicating one or more prioritized transmission units corresponding to one of the user data in the user group table, wherein the transmission request part is configured to request transmission of the transmission data to the one or more prioritized transmission units in a case where the user data extracted by the reception part includes the data indicating the one or more prioritized transmission units, and storing the data indicating the one or more prioritized transmission units in a predetermined order, wherein the transmission request part is configured to request transmission of the transmission data to the one or more prioritized transmission units according to the predetermined order in a case where the user data extracted by the reception part includes the data indicating the prioritized transmission unit, wherein the transmission request part cancels the request when the one or more prioritized transmission units completes transmitting the transmission data.

* * * * *